(12) United States Patent
Kondo et al.

(10) Patent No.: US 8,648,142 B2
(45) Date of Patent: Feb. 11, 2014

(54) POLY (ARYLENE SULFIDE) RESIN COMPOSITION AND PRODUCTION PROCESS THEREOF

(75) Inventors: Hidemi Kondo, Shizuoka (JP); Koichi Suzuki, Fukushima (JP); Hiroyuki Sato, Fukushima (JP)

(73) Assignees: Polyplastics Co., Ltd., Minato-ku, Tokyo (JP); Kureha Corporation, Chuo-ku, Tokyo (JP)

( * ) Notice: Subject to any disclaimer, the term of this patent is extended or adjusted under 35 U.S.C. 154(b) by 1261 days.

(21) Appl. No.: 11/794,045

(22) PCT Filed: Dec. 15, 2005

(86) PCT No.: PCT/JP2005/023441
§ 371 (c)(1),
(2), (4) Date: Jun. 21, 2007

(87) PCT Pub. No.: WO2006/068161
PCT Pub. Date: Jun. 29, 2006

(65) Prior Publication Data
US 2008/0004375 A1    Jan. 3, 2008

(30) Foreign Application Priority Data

Dec. 21, 2004  (JP) .................................. 2004-368838

(51) Int. Cl.
| | | |
|---|---|---|
| *C08K 7/16* | (2006.01) | |
| *C08K 3/40* | (2006.01) | |
| *C08K 3/04* | (2006.01) | |
| *C08G 18/42* | (2006.01) | |

(52) U.S. Cl.
USPC ............ 524/494; 523/223; 524/495; 524/500

(58) Field of Classification Search
USPC .......................... 523/223; 524/494, 495, 500
See application file for complete search history.

(56) References Cited

U.S. PATENT DOCUMENTS

| | | | |
|---|---|---|---|
| 4,812,539 A * | 3/1989 | Iizuka et al. ................... | 526/62 |
| 4,956,499 A * | 9/1990 | Fukuda et al. ................ | 524/500 |
| 4,985,175 A | 1/1991 | Dziurla et al. | |
| 5,179,165 A | 1/1993 | Harry, Sr. | |
| 5,200,500 A | 4/1993 | Iizuka et al. | |
| 5,268,451 A | 12/1993 | Iizuka et al. | |
| 6,316,536 B1 | 11/2001 | Okamoto et al. | |
| 6,388,003 B1 | 5/2002 | Okamoto et al. | |
| 2001/0047053 A1 | 11/2001 | Okamoto et al. | |
| 2002/0161172 A1 | 10/2002 | Okamoto et al. | |
| 2006/0084785 A1 | 4/2006 | Sato et al. | |

FOREIGN PATENT DOCUMENTS

| | | |
|---|---|---|
| EP | 0 103 896 A2 | 9/1983 |
| EP | 0 557 088 A2 | 2/1993 |
| EP | 1 114 847 A1 | 7/2000 |
| EP | 1 234 856 A1 | 6/2001 |
| EP | 1 452 567 A1 | 11/2002 |
| EP | 1 466 946 A1 | 11/2002 |
| JP | 64-009266 | 3/1988 |
| JP | 01-299826 | 5/1988 |
| JP | 05-032896 | 7/1991 |
| JP | 09-087518 | 9/1995 |
| JP | 11-158280 | 11/1997 |
| JP | 11-228829 | 2/1998 |
| JP | 11-335559 | 5/1998 |
| JP | 2002-212292 | 1/2001 |
| JP | 2003-105087 | 6/2002 |
| JP | 2003-096190 | 7/2002 |
| WO | 2004060972 | 7/2004 |

OTHER PUBLICATIONS

EPO extended European search report dated Apr. 7, 2008.
International Search Report for PCT/JP2005/023441 dated Mar. 20, 2006.

* cited by examiner

*Primary Examiner* — Ling Choi
*Assistant Examiner* — Ronald Grinsted
(74) *Attorney, Agent, or Firm* — Reed Smith LLP

(57) ABSTRACT

A poly(arylene sulfide) resin composition including 100 parts by weight of a substantially linear straight-chain poly(arylene sulfide) resin, 1 to 50 parts by weight of a branched poly (arylene sulfide) resin having a melt viscosity of $11.0 \times 10^4$ to $27.0 \times 10^4$ Pa·s as measured at a temperature of 330° C. and a shear rate of 2 $sec^{-1}$, an average particle diameter of 50 to 2,000 μm and a melt viscoelasticity tan δ of 0.10 to 0.30 as measured at a temperature of 310° C. and an angular velocity of 1 rad/sec, and 1 to 400 parts by weight of an inorganic filler, and a production process thereof.

17 Claims, 2 Drawing Sheets

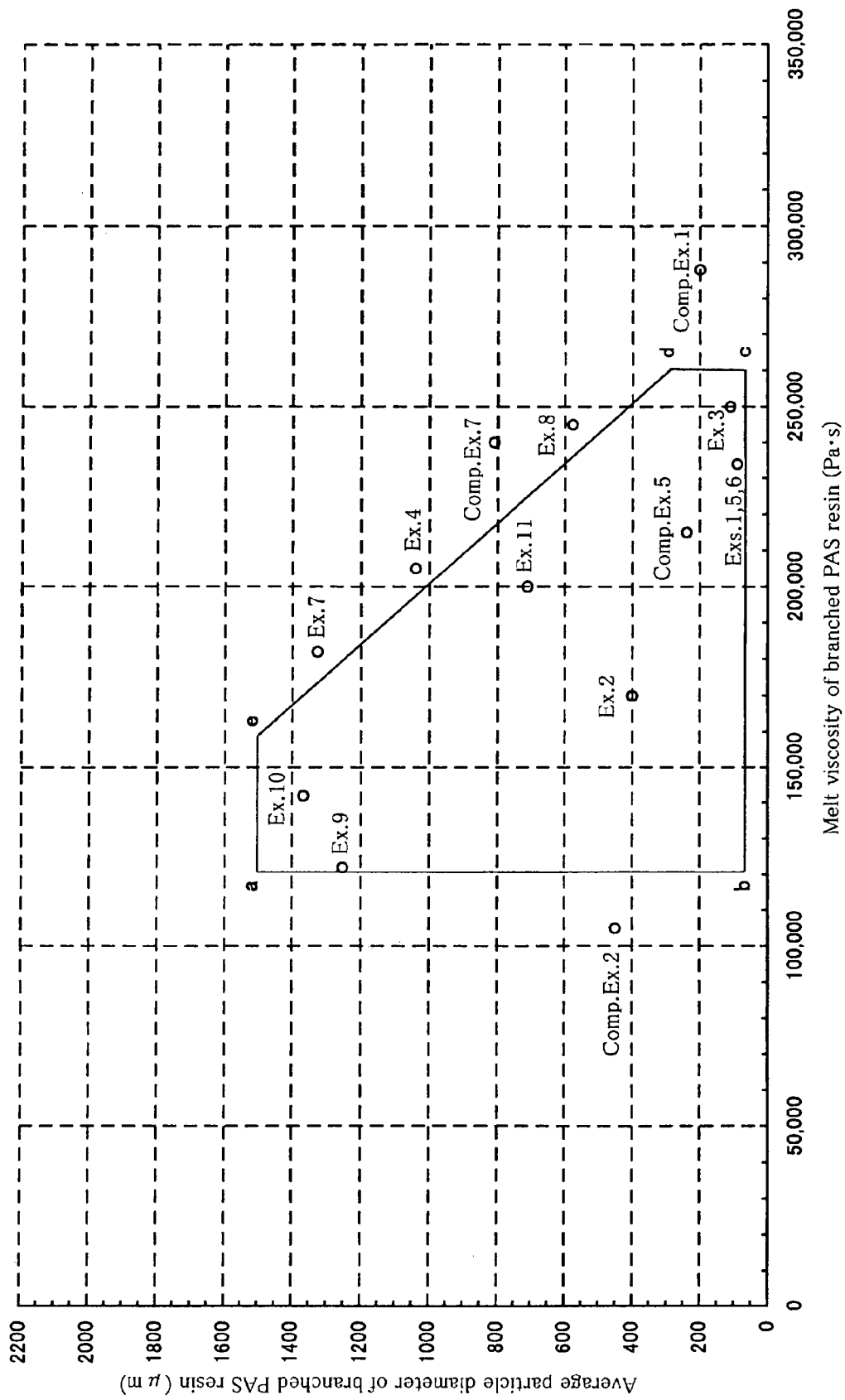

POLY (ARYLENE SULFIDE) RESIN COMPOSITION AND PRODUCTION PROCESS THEREOF

TECHNICAL FIELD

The present invention relates to a poly(arylene sulfide) resin composition, by which the occurrence of burr upon injection molding is markedly inhibited, and molded products excellent in surface properties can be provided, and which has little mold-corroding tendency, and a production process thereof.

In the present invention, a branched poly(arylene sulfide) resin means a poly(arylene sulfide) resin into which a branched structure has been introduced by polymerization. A straight-chain poly(arylene sulfide) resin means a poly (arylene sulfide) resin having a substantially linear structure and subjected to no heat crosslinking (curing). A heat-crosslinked poly(arylene sulfide) resin means a poly(arylene sulfide) resin obtained by subjecting the straight-chain poly (arylene sulfide) resin having a substantially linear structure to a heat treatment to introduce a crosslinked structure thereinto.

In the present invention, a sulfur source in a charging step is referred to as "a charged sulfur source" or "an available sulfur source" for distinguishing it from a sulfur source charged into a reaction vessel in a dehydration step. The reason for it is that the amount of the sulfur source charged into the reaction vessel in the dehydration step is varied by a dehydration treatment under heat. The charged sulfur source is consumed by a reaction with a dihalo-aromatic compound and a polyhalo-aromatic compound in a polymerization step. However, molar ratios to other components are defined on the basis of a molar amount of the charged sulfur source in the charging step.

BACKGROUND ART

Poly(arylene sulfide) resins (hereinafter abbreviated as "PAS resins") represented by a poly(phenylene sulfide) resin (hereinafter abbreviated as "PPS resin") are engineering plastics excellent in heat resistance, chemical resistance, flame retardancy, mechanical strength, electrical properties, dimensional stability and the like. The PAS resins are commonly used as materials for resin parts in a wide variety of fields such as electrical and electronic equipments, automotive equipments and chemical equipments because they can be molded or formed into various kinds of molded products, films, sheets, fibers, etc. by general melt processing processes such as injection, molding, extrusion and compression molding.

As a typical production process of a PAS resin, is known a process in which a sulfur source and a dihalo-aromatic compound are subjected to a polymerization reaction in an organic amide solvent such as N-methyl-2-pyrrolidone (hereinafter abbreviated as "NMP"). However, the PAS resin has a defect that the amount of burr produced upon injection molding is great. The burr means portions of a molding material, which have flown out in interstices of a mold and solidified. Burr solidified in the form of a thin film or flake requires to be removed in a finishing step.

A process, in which a branched PAS resin or heat-crosslinked PAS resin is blended with a straight-chain PAS resin, has been proposed for inhibiting the occurrence of burr upon injection molding. In addition, some proposals have been made on a production process of the branched PAS resin. However, the conventional processes are difficult to cope with a high requirement level in recent years.

A PAS resin composition obtained by blending a crosslinked PAS resin having a melt viscosity of $5 \times 10^5$ to $1 \times 10^9$ P ($5 \times 10^4$ to $1 \times 10^8$ Pa·s) as measured at a temperature of 310° C. and a shear rate of 5 sec$^{-1}$ and exhibiting a gel form upon melting with an uncrosslinked and substantially linear straight-chain PAS resin, and improved in burr-producing tendency has heretofore been proposed in Japanese Patent Application Laid-Open No. 64-9266 (corresponding to U.S. Pat. No. 4,956,499; hereinafter referred to as "Article 1").

Article 1 shows an Experimental Example in which a crosslinked PAS resin was produced by a process including polymerizing an alkali metal sulfide, a dihalo-aromatic compound and a polyhalo-aromatic compound having 3 or more halogen substituents in an organic amide solvent by two stages. More specifically, the crosslinked PAS resin is produced by a two-stage polymerization process including reacting sodium sulfide, p-dichlorobenzene and 1,2,4,5-tetrachlorobenzene in NMP, and then adding water and raising the temperature to continue the polymerization reaction. However, the crosslinked PAS resin obtained by this production process is a mixture of a small amount of a granular product and a great amount of a bulky product (see "Polymer Preparation Example B-1" in Article 1). A resin composition with such a crosslinked PAS resin blended with a straight-chain PAS resin is poor in molding and processing ability, and the surface properties of a molded product obtained therefrom are also poor.

In addition, Article 1 discloses a heat-crosslinked PAS resin obtained by subjecting a substantially linear straight-chain PAS resin to a heat treatment for a long period of time at a high temperature, thereby conducting high-temperature curing (see "Polymer Preparation Examples B-4 to B-6" in Article 1). However, a resin composition with the heat-crosslinked PAS resin blended with a straight-chain PAS resin has involved a problem that it corrodes a mold used in injection molding. The heat-crosslinked PAS resin is considered to contain a corrosive component caused by a thermal decomposition reaction or the like due to the heat treatment for a long period of time at a high temperature.

A process for producing an alkali metal sulfide, a dihalo-aromatic compound and a polyhalo-aromatic compound having 3 or more halogen substituents in an organic amide solvent by an improved two-stage polymerization process has heretofore been proposed in Japanese Patent Application Laid-Open No. 1-299826 (corresponding to U.S. Pat. Nos. 5,200,500 and 5,268,451; hereinafter referred to as "Article 2"). Article 2 discloses a process including reacting, in a first-stage polymerization step, the alkali metal sulfide, dihalo-aromatic compound and polyhalo-aromatic compound in a state that water is present in a proportion of 0.5 to 2.9 mol per mol of a charged alkali metal sulfide in the organic amide solvent, and controlling, in a second-stage polymerization step, the amount of water in such a manner that water is present in a proportion of 2.5 to 7 mol per mol of the charged alkali metal sulfide and raising the temperature to continue the polymerization reaction. According to the production process disclosed in Article 2, a highly crosslinked PAS resin can be obtained in the form of granules without forming a bulky product.

However, when the alkali metal sulfide, dihalo-aromatic compound and polyhalo-aromatic compound are reacted from the beginning of the polymerization, a branched PAS resin having a too high melt viscosity is easy to be provided. When the branched PAS resin having a too high melt viscosity is blended with a straight-chain PAS resin, defects such as hard spots (non-melt matter) and small depressions occur in a molded product to deteriorate its surface properties, and moreover the inhibitory effect on the occurrence of burr is also insufficient.

On the other hand, when the polymerization time in the second-stage polymerization step in the production process described in Article 2 is markedly shortened, a branched PAS resin having a low melt viscosity can be obtained. However, the branched PAS resin having a low melt viscosity obtained by such a process has great melt viscoelasticity tan δ, and the inhibitory effect on the occurrence of burr is poor even when it is blended with the straight-chain PAS resin, so that the surface properties of the resulting molded product are deteriorated.

DISCLOSURE OF THE INVENTION

It is an object of the present invention to provide a poly(arylene sulfide) resin composition, by which the occurrence of burr upon injection molding is markedly inhibited, and molded products excellent in surface properties can be provided, and which has little mold-corroding tendency.

In particular, the object of the present invention is to provide a poly(arylene sulfide) resin composition containing a novel branched poly(arylene sulfide) resin, which can markedly inhibit the occurrence of burr when blended with a straight-chain poly(arylene sulfide) resin, does not impair the surface properties of the resulting molded product and does not have a mold-corroding tendency, and a production process thereof.

When a heat-crosslinked PAS resin is blended for the purpose of inhibiting the occurrence of burr in a straight-chain PAS resin, a PAS resin composition having a mold-corroding tendency is obtained. When an expensive mold is corroded, precise molding cannot be conducted, and moreover cost is increased. On the other hand, when a conventional branched PAS resin is blended with a straight-chain PAS resin as a polymer modifier for inhibiting the occurrence of burr, the resultant PAS resin composition is insufficient in the inhibitory effect on the occurrence of burr though it has little mold-corroding tendency, and the surface properties of the resulting molded product are also not sufficiently satisfactory.

The present inventors have carries out an investigation as to the reason why the conventional branched PAS resin cannot exhibit a sufficient burr-inhibiting effect when blended with the straight-chain PAS resin, and the surface properties of the resulting molded product are also insufficient. As a result, the reason has been considered to be attributable to the fact that the melt viscosity, average particle diameter and melt viscoelasticity of such a resin are not balanced with one another at a high level. In the production process of the conventional branched PAS resin, is adopted a process including subjecting a sulfur source, a dihalo-aromatic compound and a polyhalo-aromatic compound having 3 or more halogen substituents to a polymerization reaction from the beginning of the polymerization. It has been found that according to such a production process, it is difficult to obtain a branched PAS resin balanced between melt viscosity and melt viscoelasticity from the viewpoint of burr-inhibiting effect even when polymerization conditions are devised. In addition, the present inventors have found that it is essential to the inhibition of the occurrence of burr and improvement in the surface properties of the resulting molded article to control an average particle diameter of the branched PAS resin in addition to the melt viscosity and melt viscoelasticity of the branched PAS resin.

Thus, the present inventors have carried out an extensive investigation. As a result, the inventors have conceived of a process including reacting a sulfur source and a dihalo-aromatic compound in an organic amide solvent and adding a polyhalo-aromatic compound having 3 or more halogen substituents in a predetermined proportion to the polymerization reaction mixture at the point of time the conversion of the dihalo-aromatic compound have become sufficiently high. The polymerization reaction mixture, to which the polyhalo-aromatic compound has been added, is heated at a predetermined heating rate, and the polymerization reaction is continued at a high temperature in the presence of a phase separation agent.

According to this production process, a branched PAS resin having a melt viscosity suitable for use as a polymer modifier such as an inhibitor of the occurrence of burr can be obtained in the form of granules. According to this production process, the melt viscoelasticity tan δ of the resulting branched PAS resin can be controlled within a range suitable for use as the inhibitor of the occurrence of burr. In other words, according to the results of researches by the present inventors, it has been found that all the melt viscosity, average particle diameter and melt viscoelasticity tan δ of a branched PAS resin fall within respective proper ranges, whereby such a branched PAS resin exhibits a markedly excellent effect as an inhibitor of the occurrence of burr when blended with a straight-chain PAS resin, the surface properties of the resulting molded product are improved, and such a blend has little mold-corroding tendency. The present invention has been led to completion on the basis of these findings.

According to the present invention, there is thus provided a poly(arylene sulfide) resin composition comprising (A) 100 parts by weight of a substantially linear straight-chain poly(arylene sulfide) resin, (B) 1 to 50 parts by weight of a branched poly(arylene sulfide) resin having a melt viscosity of $11.0 \times 10^4$ to $27.0 \times 10^4$ Pa·s as measured at a temperature of 330° C. and a shear rate of 2 $\sec^{-1}$, an average particle diameter of 50 to 2,000 μm and a melt viscoelasticity tan δ of 0.10 to 0.30 as measured at a temperature of 310° C. and an angular velocity of 1 rad/sec, and (C) 1 to 400 parts by weight of an inorganic filler.

According to the present invention, there is also provided a process for producing a poly(arylene sulfide) resin composition, comprising the following Steps I to III:

I) Polymerization Step I of subjecting a sulfur source and a dihalo-aromatic compound to a polymerization reaction at a temperature of 170 to 270° C. in an organic amide solvent, adding a polyhalo-aromatic compound in an amount of 0.010 to 0.100 mol per mol of the sulfur source, and a phase separation agent to the resultant polymerization reaction mixture at the point of time the conversion of the dihalo-aromatic compound has reached at least 80%, then heating the polymerization reaction mixture at a heating rate of 10 to 60° C./hour to raise the temperature of the mixture to at least 240° C., and continuing the polymerization reaction at a temperature of 240 to 290° C.;

II) Step II of arranging a step of grinding a polymer formed as needed after the polymerization step to recover a branched poly(arylene sulfide) resin having a melt viscosity of $11.0 \times 10^4$ to $27.0 \times 10^4$ Pa·s as measured at a temperature of 330° C. and a shear rate of 2 $\sec^{-1}$, an average particle diameter of 50 to 2,000 μm and a melt viscoelasticity tan δ of 0.10 to 0.30 as measured at a temperature of 310° C. and an angular velocity of 1 rad/sec; and III) Step III of blending 1 to 50 parts by weight of the branched poly(arylene sulfide) resin and 1 to 400 parts by weight of an inorganic filler with 100 parts by weight of a substantially linear straight-chain poly(arylene sulfide) resin.

BRIEF DESCRIPTION OF THE DRAWINGS

FIG. 2 is a graph illustrating a more preferable relationship between the melt viscosity and average particle diameter of branched PAS resins used in Examples and Comparative Examples, and the surface properties of the resulting molded products.

BEST MODE FOR CARRYING OUT THE INVENTION

1. Straight-Chain PAS Resin

Figure 1:
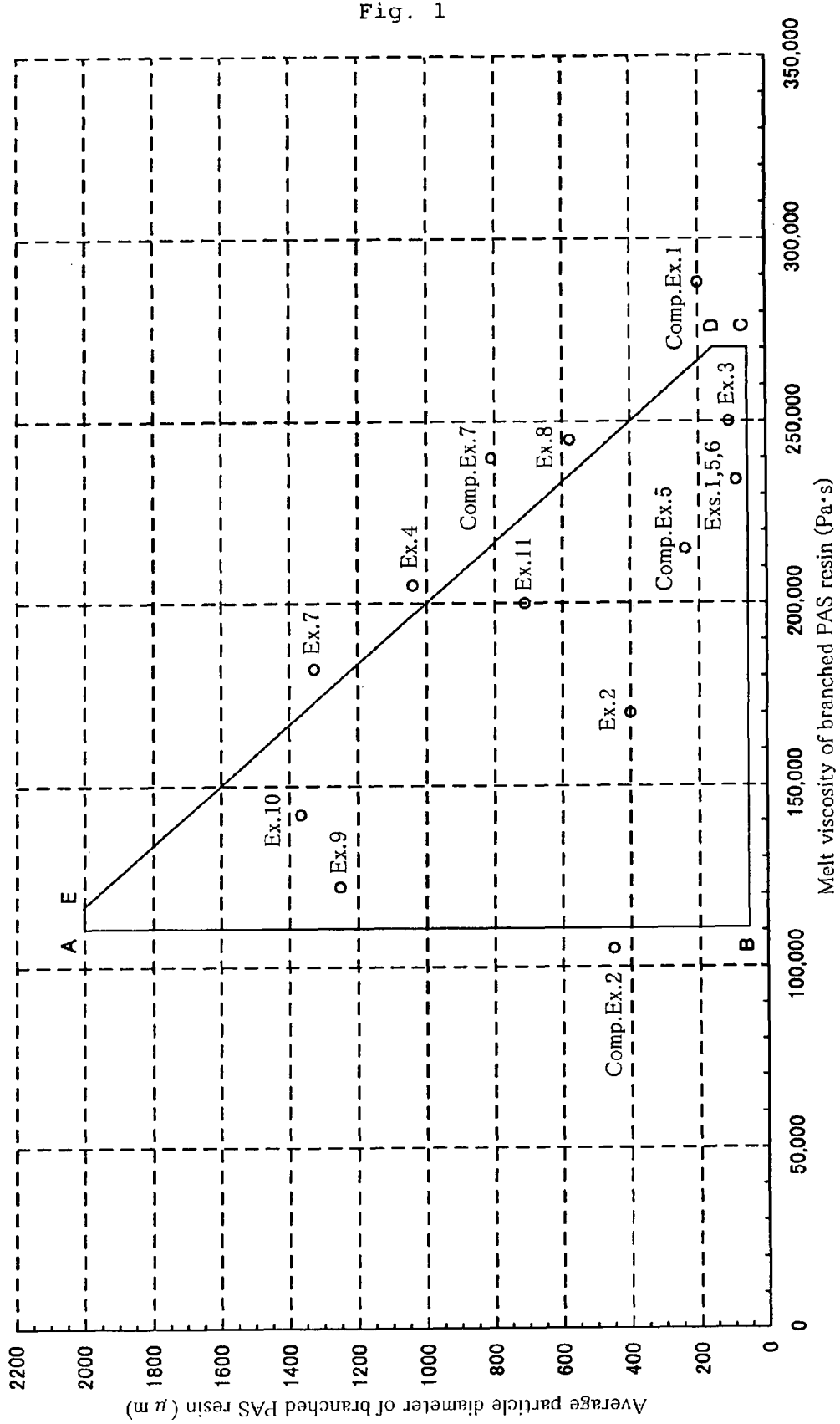
FIG. 1 is a graph illustrating a preferable relationship between the melt viscosity and average particle diameter of branched PAS resins used in Examples and Comparative Examples, and the surface properties of the resulting molded products.

The substantially linear straight-chain PAS resin used in the present invention is a polymer having a repeating unit —(Ar—S)— (in the formula, Ar is an arylene group) as a principal component. Examples of the arylene group include a p-phenylene group, a m-phenylene group, an o-phenylene group, substituted phenylene groups, a p,p'-diphenylene sulfone group, a p,p'-biphenylene group, a p,p'-diphenylene ether group, a p,p'-diphenylenecarbonyl group and a naphthylene group.

The straight-chain PAS resin is preferably a homopolymer containing each of the above-described repeating units by itself, or a copolymer containing 2 or more of the repeating units. As the homopolymer is preferred a poly(p-phenylene sulfide) resin having a p-phenylene group as the arylene group. When a copolymer is provided for improving processability, a poly(phenylene sulfide) resin having a repeating unit of p-phenylene sulfide and a repeating unit of m-phenylene sulfide is preferred.

When the straight-chain PAS resin is a copolymer having the repeating unit of p-phenylene sulfide, the copolymer is desirably a copolymer containing the repeating unit of p-phenylene sulfide in a proportion of preferably at least 70 mol %, more preferably at least 80 mol % from the viewpoints of heat resistance, moldability and mechanical properties. The p-phenylene sulfide/m-phenylene sulfide copolymer desirably contains the repeating unit of m-phenylene sulfide in a proportion of preferably 5 to 30 mol %, more preferably 10 to 20 mol %. The arrangement of the respective repeating units may be either random or block. A block copolymer is preferred from the viewpoints of moldability, heat resistance and mechanical properties.

As the straight-chain PAS resin is preferred a PAS resin having a linear structure obtained by polycondensation of a sulfur source with a dihalo-aromatic compound and substantially containing neither a branched structure nor a heat-crosslinked structure. The straight-chain PAS resin may be a resin into which some branched structures have been introduced by causing a polyhalo-aromatic compound having 3 or more halogen substituents in its molecule to exist in an extremely small proportion (less than 0.01 mol per mol of the sulfur source) upon the polycondensation of the sulfur source with the dihalo-aromatic compound. The straight-chain PAS resin may be a resin into which some heat-crosslinked structures have been introduced by various heat histories upon preparation. The straight-chain PAS resin is a polymer having excellent flowability and mechanical properties, but on the other hand having a great tendency to produce burr.

The straight-chain PAS resin used in the present invention desirably has a melt viscosity ranging preferably from 5 to 1,000 Pa·s, more preferably from 10 to 500 Pa·s, still more preferably from 15 to 300 Pa·s as measured at a temperature of 310° C. and a shear rate of 1,216 $\sec^{-1}$ from the viewpoint of excellent balance between mechanical properties and flowability. If the melt viscosity of the straight-chain PAS resin is too low, the mechanical properties thereof become insufficient. If the melt viscosity is too high, the flowability of the resulting resin composition upon melt molding becomes poor, resulting in difficulty of molding operation.

2. Branched PAS Resin

The branched PAS resin used in the present invention is a branched PAS resin with a branched structure introduced into a molecule thereof, which is obtained by polymerizing a sulfur source and a dihalo-aromatic compound in the presence of a polyhalo-aromatic compound having 3 or more halogen substituents. The branched PAS resin used in the present invention requires to have a melt viscosity of $11.0 \times 10^4$ to $27.0 \times 10^4$ Pa·s as measured at a temperature of 330° C. and a shear rate of 2 $\sec^{-1}$, an average particle diameter of 50 to 2,000 μm and a melt viscoelasticity tan δ of 0.10 to 0.30 as measured at a temperature of 310° C. and an angular velocity of 1 rad/sec from the viewpoints of exhibiting a sufficient inhibitory effect on the occurrence of burr and providing a molded product excellent in surface properties.

Such a branched PAS resin can be produced by a production process of a branched PAS resin by polymerizing a sulfur source and a dihalo-aromatic compound in the presence of a polyhalo-aromatic compound having 3 or more halogen substituents in its molecule in an organic amide solvent, the production process including a first-stage polymerization step of subjecting the sulfur source and the dihalo-aromatic compound to a polymerization reaction at a temperature of 170 to 270° C. in the organic amide solvent, and adding the polyhalo-aromatic compound in an amount of 0.010 to 0.100 mol per mol of the sulfur source, and a phase separation agent to the resultant polymerization reaction mixture at the point of time the conversion of the dihalo-aromatic compound has reached at least 80%; a heating step of then heating the polymerization reaction mixture at a heating rate of 10 to 60° C./hour to raise the temperature of the mixture to at least 240° C.; and a second-stage polymerization step of continuing the polymerization reaction at a temperature of 240 to 290° C. After the polymerization steps, a grinding step may be arranged as needed to control the average particle diameter of the branched PAS resin within a desired range.

In the above-described production process, it is preferable that a sulfur source including an alkali metal hydrosulfide is used, and the polymerization is conducted in the presence of an alkali metal hydroxide. It is also generally desirable that a dehydration step and a charging step be arranged prior to the first-stage polymerization step to precisely control the proportions of the respective components used. Accordingly, a preferable production process of the branched PAS resin according to the present invention is as follows.

A production process of a branched poly(arylene sulfide) resin by polymerizing a sulfur source and a dihalo-aromatic compound in the presence of a polyhalo-aromatic compound having 3 or more halogen substituents in its molecule in an organic amide solvent, the production process including the following Steps 1 to 5:

(1) Dehydration Step 1 of heating a mixture containing the organic amide solvent, the sulfur source including an alkali metal hydrosulfide, and an alkali metal hydroxide to discharge at least a part of a distillate containing water from the interior of the system containing the mixture to the exterior of the system;

(2) Charging Step 2 of mixing the mixture remaining in the system after the dehydration step with the dihalo-aromatic compound to prepare a charging mixture containing the organic amide solvent, the sulfur source (hereinafter referred to as "charged sulfur source"), the alkali metal hydroxide, water and the dihalo-aromatic compound;

(3) First-Stage Polymerization Step 3 of heating the charging mixture to a temperature of 170 to 270° C., thereby subjecting the sulfur source and the dihalo-aromatic compound to a polymerization reaction in the organic amide solvent containing water, and adding the polyhalo-aromatic compound in an amount of 0.010 to 0.100 mol per mol of the charged sulfur source, and a phase separation agent to the resultant polymerization reaction mixture at the point of time the conversion of the dihalo-aromatic compound has reached at least 80%;
(4) Heating Step 4 of heating the polymerization reaction mixture at a heating rate of 10 to 60° C./hour to raise the temperature of the mixture to at least 240° C.; and
(5) Second-Stage Polymerization Step 5 of continuing the polymerization reaction at a temperature of 240 to 290° C.

The production materials, production process and physical properties of the branched PAS resin will hereinafter be described in more detail.

2.1. Sulfur Source

In the present invention, an alkali metal sulfide, an alkali metal hydrosulfide or a mixture thereof is used as a sulfur source. Hydrogen sulfide may also be used as a sulfur source. More specifically, when an alkali metal hydroxide (for example, NaOH) is present in excess in a reaction vessel after the dehydration step, hydrogen sulfide is blown into the reaction vessel, whereby an alkali metal sulfide (for example, $Na_2S$) can be formed. An alkali metal hydrosulfide or a sulfur source containing the alkali metal hydrosulfide as a main component is preferred as the sulfur source.

As examples of the alkali metal hydrosulfide, may be mentioned lithium hydrosulfide, sodium hydrosulfide, potassium hydrosulfide, rubidium hydrosulfide, cesium hydrosulfide and mixtures of two or more compounds thereof. However, the alkali metal hydrosulfide is not limited thereto. The alkali metal hydrosulfide may be used in any form of an anhydride, a hydrate and an aqueous solution. Among these, sodium hydrosulfide and lithium hydrosulfide are preferred in that they are industrially available on the cheap. The alkali metal hydrosulfide is preferably used as an aqueous mixture (i.e., a mixture with water having fluidity) such as an aqueous solution from the viewpoints of processing operation, metering, etc.

In general, a small amount of an alkali metal sulfide is secondarily produced in a production process of the alkali metal hydrosulfide. A small amount of the alkali metal sulfide may be contained in the alkali metal hydrosulfide used in the present invention. The alkali metal hydrosulfide tends to become a stable state when it contains a small amount of the alkali metal sulfide.

When the mixture of the alkali metal hydrosulfide and the alkali metal sulfide is used as the sulfur source, thus, the mixture is preferably a mixture including the alkali metal hydrosulfide as a main component, more preferably a mixture containing more than 50 mol % of the alkali metal hydrosulfide and less than 50 mol % of the alkali metal sulfide. When the sulfur source is a mixture of the alkali metal hydrosulfide and the alkali metal sulfide, the composition thereof is preferably composed of 70 to 99.5 mol % of the alkali metal hydrosulfide and 0.5 to 30 mol % of the alkali metal sulfide, more preferably 90 to 99.5 mol % of the alkali metal hydrosulfide and 0.5 to 10 mol % of the alkali metal sulfide, still more preferably 95 to 99.5 mol % of the alkali metal hydrosulfide and 0.5 to 5 mol % of the alkali metal sulfide, particularly preferably 97 to 99.5 mol % of the alkali metal hydrosulfide and 0.5 to 3 mol % of the alkali metal hydroxide from the viewpoint of stability of the polymerization reaction system.

When the sulfur source is a mixture of the alkali metal hydrosulfide and the alkali metal sulfide, the total molar quantity of the alkali metal hydrosulfide and the alkali metal sulfide becomes a molar quantity of the charged sulfur source (may be referred to as "available sulfur source"). When a dehydration step is arranged prior to the charging step, this total molar quantity becomes a molar quantity of the charged sulfur source after the dehydration step.

As examples of the alkali metal sulfide, may be mentioned lithium sulfide, sodium sulfide, potassium sulfide, rubidium sulfide, cesium sulfide and mixtures of two or more compounds thereof. However, the alkali metal sulfide is not limited thereto. The alkali metal sulfide may be used in any form of an anhydride, a hydrate and an aqueous solution. Among these, sodium sulfide is preferred in that it is industrially available on the cheap and easy to handle. As these alkali metal sulfides, may also be used those generally marketed in the form of a hydrate in addition to those contained in alkali metal hydrosulfides as by-products. Examples of the hydrate of the alkali metal sulfide include sodium sulfide nonahydrate ($Na_2S.9H_2O$) and sodium sulfide pentahydrate ($Na_2S.5H_2O$) The alkali metal sulfide is preferably used as an aqueous mixture (i.e., a mixture with water having fluidity) such as an aqueous solution from the viewpoints of processing operation, metering, etc.

2.2. Alkali Metal Hydroxide

In the production process according to the present invention, a process including polymerizing a sulfur source containing an alkali metal hydrosulfide and a dihalo-aromatic compound in the presence of an alkali metal hydroxide in an organic amide solvent containing water is preferably adopted.

Examples of the alkali metal hydroxide include lithium hydroxide, sodium hydroxide, potassium hydroxide, rubidium hydroxide, cesium hydroxide and mixtures of two or more compounds thereof. However, the alkali metal hydroxide is not limited thereto. Among these, sodium hydroxide is preferred in that it is industrially available on the cheap. The alkali metal hydroxide is preferably used as an aqueous mixture (i.e., a mixture with water having fluidity) such as an aqueous solution from the viewpoint of handling property such as metering.

2.3. Dihalo-Aromatic Compound

The dihalo-aromatic compound used in the present invention is a dihalogenated aromatic compound having 2 halogen atoms directly bonded to the aromatic ring. Specific examples of the dihalo-aromatic compound include o-dihalobenzenes, m-dihalobenzenes, p-dihalobenzenes, dihalotoluenes, dihalonaphthalenes, methoxy-dihalobenzenes, dihalobiphenyls, dihalobenzoic acids, dihalodiphenyl ethers, dihalodiphenyl sulfones, dihalodiphenyl sulfoxides and dihalodiphenyl ketones. These dihalo-aromatic compounds may be used either singly or in any combination thereof.

Here, the halogen atom means each atom of fluorine, chlorine, bromine and iodine, and 2 halogen atoms in the same dihalo-aromatic compound may be the same or different from each other. In many cases, o-dichlorobenzene, m-dichlorobenzene, p-dichlorobenzene or a mixture of 2 or more compounds thereof is used as the dihalo-aromatic compound.

2.4. Polyhalo-Aromatic Compound

In the present invention, a polyhalo-aromatic compound having 3 or more halogen substituents is used for introducing a branched structure into the PAS resin. A halogen substituent is generally a halogen atom directly bonded to the aromatic ring. The halogen atom means each atom of fluorine, chlorine, bromine and iodine, and plural halogen atoms in the same dihalo-aromatic compound may be the same or different from each other.

Specific examples of the polyhalo-aromatic compound include 1,2,3-trichlorobenzene, 1,2,4-trichlorobenzene, 1,3,5-trichlorobenzene, hexachlorobenzene, 1,2,3,4-tetrachlorobenzene, 1,2,4,5-tetrachlorobenzene, 1,3,5-trichloro-2,4,6-trimethylbenzene, 2,4,6-trichlorotoluene, 1,2,3-trichloronaphthalene, 1,2,4-trichloronaphthalene, 1,2,3,4-tetrachloronaphthalene, 2,2',4,4'-tetrachlorobiphenyl, 2,2',4,4'-tetrachlorobenzophenone and 2,4,2'-trichlorobenzophenone.

These polyhalo-aromatic compounds may be used either singly or in any combination thereof. Among the polyhalo-aromatic compounds, trihalobenzenes such as 1,2,4-trichlorobenzene and 1,3,5-trichlorobenzene are preferred, and trichlorobenzenes are more preferred.

A small amount of, for example, an active hydrogen-containing halogenated aromatic compound or halogenated aromatic nitro compound may also be used in combination for introducing a branched or crosslinked structure.

2.5. Molecular Weight Modifier

In order to form a terminal of a specific structure in a PAS formed or modify a polymerization reaction or a molecular weight, a monohalo-compound (may not be always an aromatic compound) may be used in combination.

2.6. Organic Amide Solvent

In the present invention, an organic amide solvent that is an aprotic polar organic solvent is used as a solvent for the dehydration reaction and polymerization reaction. The organic amide solvent is preferably stable to an alkali at a high temperature. Specific examples of the organic amide solvent include amide compounds such as N,N-dimethylformamide and N,N-dimethylacetamide; N-alkylcaprolactam compounds such as N-methyl-ε-caprolactam; N-alkylpyrrolidone compounds or N-cycloalkylpyrrolidone compounds such as N-methyl-2-pyrrolidone and N-cyclohexyl-2-pyrrolidone; N,N-dialkylimidazolidinone compounds such as 1,3-dialkyl-2-imidazolidinones; tetraalkylurea compounds such as tetramethylurea; and hexaalkylphosphoric triamide compounds such as hexamethylphosphoric triamide. These organic amide solvents may be used either singly or in any combination thereof.

Among these organic amide solvents, N-alkylpyrrolidone compounds, N-cycloalkylpyrrolidone compounds, N-alkylcaprolactam compounds and N,N-dialkylimidazolidinone compounds are preferred, and N-methyl-2-pyrrolidone (NMP), N-methyl-ε-caprolactam and 1,3-dialkyl-2-imidazolidinones are particularly preferably used.

2.7. Polymerization Aid

In order to promote the polymerization reaction, various kinds of polymerization aids may be used in the present invention as needed. Specific examples of the polymerization aids include metal salts of organic sulfonic acids, lithium halides, metal salts of organic carboxylic acids and alkali metal salts of phosphoric acid, which are generally publicly known as polymerization aids for PAS resins.

2.8. Phase Separation Agent

As the phase separation agent, may be used a substance, which is known in this technical field to function as a phase separation agent, such as an alkali metal carboxylate such as sodium acetate, lithium acetate, lithium propionate or lithium benzoate; or water. The alkali metal carboxylate is included in the above-described metal salts of organic carboxylic acids and may also be used as the polymerization aid. In the present invention, however, the alkali metal carboxylate is used in an amount capable of functioning as the phase separation agent in the second-stage polymerization step. Among these phase separation agents, water is preferred in that its cost is cheap, and a post treatment is easy.

2.9. Production Process Of Branched PAS Resin

The branched PAS resin according to the present invention can be obtained according to the above-described production process. In the production processes of PAS resins including the branched PAS resin, an alkali metal sulfide has heretofore been commonly used as the sulfur source. On the other hand, it is known to use, as a raw material of the sulfur source, an alkali metal hydrosulfide or a mixture of an alkali metal hydrosulfide and an alkali metal sulfide in place of the alkali metal sulfide and subject these sulfur sources to a polymerization reaction with a dihalo-aromatic compound in the presence of an alkali metal hydroxide.

According to the results of researches by the present inventors, it has been found that a process including using a sulfur source containing an alkali metal hydrosulfide and reacting the sulfur source with a dihalo-aromatic compound and a polyhalo-aromatic compound in the presence of an alkali metal hydroxide is suitable for use as a production process of a branched PAS resin excellent in balance among various properties. However, according to this process, it is difficult to set conditions for stably carrying out the polymerization reaction. Since a great amount of the alkali metal hydroxide is used in this process, it is difficult to inhibit side reactions. It is thus desirable that the contents of the respective components used in the polymerization reaction be exactly controlled, and the polymerization conditions be strictly controlled. Accordingly, a preferable production process of the present invention will hereinafter be described in more detail.

2.9.1. Dehydration Step

The sulfur source often contains water such as water of hydration (water of crystallization). When the sulfur source and the alkali metal hydroxide are used as aqueous mixtures, water is contained as a medium. The polymerization reaction of the sulfur source with the dihalo-aromatic compound is affected by the content of water present in the polymerization reaction system. Thus, the dehydration step is generally arranged prior to the polymerization step to control the water content in the polymerization reaction system.

In the preferable production process of the present invention, a mixture containing the organic amide solvent, the sulfur source containing the alkali metal hydrosulfide, and the alkali metal hydroxide is heated in the dehydration step to discharge at least a part of a distillate containing water from the interior of the system containing the mixture to the exterior of the system. The dehydration step is desirably conducted under an inert gas atmosphere.

The dehydration step is conducted within a reaction vessel, and the discharge of the distillate to the exterior of the system is generally conducted by discharge out of the reaction vessel. Examples of water to be dehydrated in the dehydration step include water of hydration contained in the respective raw materials charged in the dehydration step, a water medium of the aqueous mixtures and water secondarily produced by a reaction between the respective raw materials.

The charging of the respective raw materials into the reaction vessel is conducted within a temperature range of generally from 20° C. to 300° C., preferably from 20° C. to 200° C. The charging of the respective raw materials may not be in order, and the respective raw materials may be additionally charged in the course of the dehydration process. An organic amide solvent is used as a medium in the dehydration step. The organic amide solvent used in the dehydration step is preferably the same as the organic amide solvent used in the polymerization step, with N-methyl-2-pyrrolidone (NMP) being more preferred in that it is easy to be industrially available. The amount of the organic amide solvent used is generally about 0.1 to 10 kg per mol of the sulfur source charged into the reaction vessel.

The dehydration process is conducted by charging the raw materials into the reaction vessel and then heating the mixture containing the respective components in a temperature range of generally up to 300° C., preferably 100 to 250° C. for generally 15 minutes to 24 hours, preferably 30 minutes to 10 hours. Heating methods include a method of retaining a fixed temperature, a method of raising the temperature either stepwise or continuously and a method of combining both methods. The dehydration step is conducted by, for example, a batch system, a continuous system or a combined system thereof. An apparatus for conducting the dehydration step may be the same as a polymerization vessel (reactor) used in the polymerization step or different from it.

In the dehydration step, water and the organic amide solvent are distilled out in the form of vapor. Accordingly, the distillate contains water and the organic amide solvent. A part of the distillate may be refluxed into the system for the purpose of inhibiting the discharge of the organic amide solvent out of the system. However, at least a part of the distillate containing water is discharged out of the system for the purpose of controlling the water content. A minor amount of the organic amide solvent is discharged together with water out of the system when the distillate is discharged out of the system.

In the dehydration step, hydrogen sulfide resulting from the sulfur source is volatilized out. More specifically, when the mixture is heated in the dehydration step, the sulfur source reacts with water by the heating to form hydrogen sulfide and an alkali metal hydroxide, and gaseous hydrogen sulfide is volatized out. For example, 1 mol of an alkali metal hydrosulfide reacts with 1 mol of water to form 1 mol of hydrogen sulfide and 1 mol of an alkali metal hydroxide. The hydrogen sulfide volatilized out is also discharged out of the system attending on the discharging of at least a part of the distillate containing water.

The amount of the sulfur source in the mixture remaining in the system after the dehydration step is reduced from the amount of the sulfur source charged due to the hydrogen sulfide volatilized out of the system in the dehydration step. When a sulfur source including the alkali metal hydrosulfide as a main component is used, the amount of the sulfur source in the mixture remaining in the system after the dehydration step is substantially equal to a value obtained by subtracting a molar amount of hydrogen sulfide volatilized out of the system from a molar amount of the sulfur source charged. The sulfur source in the mixture remaining in the system after the dehydration step is referred to as "an available sulfur source" for distinguishing it from the sulfur source charged into the reaction vessel in the dehydration step. This available sulfur source is "a charged sulfur source" in the charging step and the subsequent polymerization steps. That is to say, "the charged sulfur source" in the present invention means an available sulfur source present in the mixture after the dehydration step.

The available sulfur source after the dehydration step is interpreted as a mixture containing the alkali metal hydrosulfide and the alkali metal sulfide. However, no particular limitation is imposed on the specific form thereof. Since it has heretofore been said that when an alkali metal hydrosulfide and an alkali metal hydroxide are heated in an organic amide solvent, they react with each other in situ to form an alkali metal sulfide, there is a possibility that when an alkali metal hydroxide is added in the dehydration step, an alkali metal sulfide may be formed by the reaction of the alkali metal hydrosulfide with the alkali metal hydroxide.

On the other hand, according to the results of recent researches on polymerization mechanisms of PAS resins, it is indicated that an alkali metal hydroxide reacts with an organic amide solvent by heating to form an alkali metal alkylaminoalkylcarboxylate, and this alkali metal alkylaminoalkylcarboxylate forms a complex with an alkali metal hydrosulfide.

Accordingly, no particular limitation is imposed on the form of the available sulfur source as a specific compound. However, it is apparent that the available sulfur source is subjected to a polymerization reaction with the dihalo-aromatic compound to form a PAS resin, and a molar ratio of the available sulfur source (charged sulfur source) to the other components greatly affects the polymerization reaction. Since the amount of the sulfur source charged first in the dehydration step is reduced due to the volatilization of hydrogen sulfide out of the system after the dehydration step, it is necessary to determine an amount of the sulfur source (available sulfur source) contained in the mixture remaining in the system after the dehydration step on the basis of the amount of the hydrogen sulfide volatilized out of the system. It is important to exactly determine the amount of the available sulfur source in that a molar ratio of the available sulfur source to the alkali metal hydroxide and a molar ratio of the available sulfur source to the dihalo-aromatic compound are controlled. Such a method for exactly determining the available sulfur source is a technique already established in this technical field.

In the dehydration step, the dehydration is conducted until the content of water including water of hydration, a water medium, secondarily produced water, etc. is lowered within a range of necessary amounts. In the dehydration step, the dehydration is desirably conducted until the water content is reduced to preferably 0.00 to 2.00 mol, more preferably 0.00 to 1.80 mol per mol of the available sulfur source. If the water content becomes too low in the dehydration step, water may be added in the charging step to regulate the water content to a desired value.

The alkali metal sulfide forms an alkali metal hydroxide by its equilibrium reaction with water. In the production process making use of the sulfur source comprising the alkali metal hydrosulfide as a main component, a molar ratio of the charged amount of the alkali metal hydroxide to a mol of the available sulfur source is calculated out in view of the amount of the alkali metal sulfide that is a minor component. When hydrogen sulfide is volatilized out of the system in the dehydration step, an alkali metal hydroxide in an amount almost equal to the number of moles of the hydrogen sulfide volatilized out is formed. Therefore, the molar ratio of the charged amount of the alkali metal hydroxide to a mol of the available sulfur source is calculated out in view of the amount of the hydrogen sulfide volatilized out as well.

In the dehydration step, it is preferable that a mixture containing the organic amide solvent, the sulfur source including the alkali metal hydrosulfide, and the alkali metal hydroxide in an amount of 0.900 to 1.050 mol per mol of the sulfur source be heated to discharge at least a part of a distillate containing water from the interior of the system containing the mixture to the exterior of the system.

If the molar ratio of the alkali metal hydroxide to a mol of the sulfur source is too low in the dehydration step, the amount of hydrogen sulfide volatilized off in the dehydration step becomes great, which tends to incur reduction in productivity due to lowering of the amount of the charged sulfur source or cause abnormal reactions and deterioration of a PAS formed due to increase of a persulfide component in the charged sulfur source remaining after the dehydration. If the molar ratio of the alkali metal hydroxide to a mol of the sulfur source is too high, change in properties of the organic amide solvent may be increased in some cases.

An apparatus for conducting the dehydration step may be the same as a reaction vessel used in the subsequent polymerization step or different from it. A material of the apparatus is preferably a corrosion-resistant material such as titanium. In the dehydration step, a part of the organic amide solvent is generally discharged together with water outside the reaction vessel. Hydrogen sulfide is discharged as a gas outside the system.

2.9.2 Charging Step

In the charging step, a charging mixture containing the organic amide solvent, the sulfur source (charged sulfur source), the alkali metal hydroxide, water and the dihalo-aromatic compound is prepared by mixing the mixture remaining in the system after the dehydration step with the dihalo-aromatic compound. Since the contents of the respective components are generally varied by the dehydration step, it is necessary to control the amounts of the respective components in the charging step in view of the amounts of the respective components in the mixture obtained in the dehydration step.

In the production process of the present invention, a charging mixture containing the respective components is preferably prepared in the charging step in such a manner that the proportions of the respective components to a mol of the charged sulfur source are 0.950 to 1.090 mol for the alkali metal hydroxide, 0.00 to 2.00 mol for water and 0.950 to 1.200 mol for the dihalo-aromatic compound. The amount of "the charged sulfur source" (available sulfur source) can be calculated out by subtracting "a molar amount of hydrogen sulfide volatilized off in the dehydration step" from "a molar amount of the sulfur source charged in the dehydration step".

The ratio (molar ratio) among the amounts of the respective components in the charging mixture is generally controlled by adding other components than the charged sulfur source into the mixture obtained in the dehydration step. The dihalo-aromatic compound is added into the mixture in the charging step. When the amounts of the alkali metal hydroxide and water in the mixture obtained in the dehydration step are small, these components are added in the charging step. When the amount of the organic amide solvent distilled out in the dehydration step is too great, the organic amide solvent is added in the charging step. Accordingly, in the charging step, the organic amide solvent, water and the alkali metal hydroxide may be added as needed in addition to the dihalo-aromatic compound.

When hydrogen sulfide is volatilized off in the dehydration step, an alkali metal hydroxide is produced by an equilibrium reaction and comes to remain in the mixture after the dehydration step. Accordingly, it is necessary to exactly grasp these amounts to determine a molar ratio of the alkali metal hydroxide to "the charged sulfur source" in the charging step. The number of moles of the alkali metal hydroxide is calculated out on the basis of the number of moles of an alkali metal hydroxide formed with hydrogen sulfide formed upon the dehydration, the number of moles of the alkali metal hydroxide added prior to the dehydration and the number of moles of the alkali metal hydroxide added in the charging step.

If the molar ratio of the alkali metal hydroxide to a mol of the charged sulfur source is too high, in some cases, change in properties of the organic amide solvent may be increased, or abnormal reactions or decomposition reactions may be caused upon polymerization. In addition, the lowering of the yield and quality of a branched PAS formed is often caused. The molar amount of the alkali metal hydroxide per mol of the charged sulfur source is preferably 0.950 to 1.090 mol, more preferably 0.980 to 1.070 mol, particularly preferably 1.000 to 1.060 mol. The molar ratio of the alkali metal hydroxide to a mol of the charged sulfur source is controlled within the above-described range in the first-stage polymerization step, whereby the polymerization reaction can be stably performed to easily provide a high-quality branched PAS resin.

A charging mixture containing a sulfur source containing more than 50 mol % of the alkali metal hydrosulfide and less than 50 mol % of the alkali metal sulfide is preferably prepared in the charging step. The sulfur source having such a composition is actually prepared in the dehydration step.

In the charging step, a molar amount of water per mol of the charged sulfur source is desirably controlled within a range of preferably 0.00 to 2.00 mol, more preferably 0.70 to 1.80 mol, particularly preferably 0.90 to 1.60 mol. If the amount of water coexisting in the first-stage polymerization step is too small, unpreferable reactions such as a decomposition reaction of a polymer formed are easy to occur. If the amount of the coexisting water is too great, a polymerization reaction speed becomes markedly slow, or decomposition reactions occur.

In the charging step, a charging mixture containing the dihalo-aromatic compound in a proportion of preferably 0.950 to 1.200 mol, more preferably 0.980 to 1.150 mol, particularly preferably 1.000 to 1.100 mol per mol of the charged sulfur source is desirably prepared. If the proportion of the dihalo-aromatic compound used does not fall within the above range, it is difficult to control the melt viscosity of the resulting resin within a desired range.

In the charging step, the amount of the organic amide solvent is desirably controlled within a range of generally 0.1 to 10 kg, preferably 0.15 to 1 kg per mol of the charged sulfur source. The amount of the organic amide solvent may be changed in the course of the polymerization steps so far as it falls within the above range.

2.9.3 First-Stage Polymerization Step

In the preferable production process of the present invention, the charging mixture is heated to a temperature of 170 to 270° C. to subject the sulfur source and the dihalo-aromatic compound to a polymerization reaction in the organic amide solvent. At the point of time the conversion of the dihalo-aromatic compound has reached at least 80%, the polyhalo-aromatic compound in a proportion of 0.010 to 0.100 mol per mol of the charged sulfur source and the phase separation agent are added into the polymerization reaction mixture.

The system of the polymerization reaction may be a batch system, a continuous system or a combination of both systems. In the batch-wise polymerization, 2 or more reaction vessels may be used for the purpose of shortening the polymerization cycle time. As a heating method, is used a method of retaining a fixed temperature, a method of raising the temperature either stepwise or continuously, or a combination of both methods. The polymerization temperature may also be lowered in the course of the polymerization reaction.

The polymerization reaction time is a total with the polymerization time in the second-stage polymerization step, and is within a range of generally from 10 minutes to 72 hours, preferably from 30 minutes to 48 hours. The polymerization time in the first-stage polymerization step is often from 30 minutes to 5 hours. The first-stage polymerization step may be composed of a plurality of steps of, for example, changing temperature conditions stepwise and adding water and the alkali metal hydroxide in portions. In the first-stage polymerization step, the polymerization reaction is generally conducted in the reaction system that the respective components including a polymer formed are uniformly dissolved.

In the first-stage polymerization step, the charging mixture is heated to a temperature of preferably 170 to 270° C., more preferably 180 to 240° C., particularly preferably 190 to 235° C. to initiate a polymerization reaction, thereby forming a prepolymer that the conversion of the dihalo-aromatic compound is at least 80%. If the polymerization temperature in the first-stage polymerization step is too high, side reactions and decomposition reactions are easy to occur.

The conversion of the dihalo-aromatic compound is preferably 80 to 98%, more preferably 80 to 95%, particularly preferably 85 to 95%. The conversion of the dihalo-aromatic compound can be calculated out on the basis of an amount of the dihalo-aromatic compound remaining in the reaction mixture, which is determined by gas chromatography, the charged amount of the dihalo-aromatic compound and the charged amount of the sulfur source. When the dihalo-aromatic compound is represented by "DHA", and the dihalo-aromatic compound is added in excess in terms of a molar ratio to the sulfur source, the conversion can be calculated out in accordance with the following equation 1:

Conversion=[(Charged amount (mol) of DHA)−(Remaining amount (mol) of DHA)]/[(Charged amount (mol) of DHA)−(Excessive amount (mol) of DHA)]  (1).

In other case than the above-describe case, the conversion can be calculated out in accordance with the following equation 2:

Conversion=[(Charged amount (mol) of DHA)−(Remaining amount of DHA)]/[Charged amount (mol) of DHA]  (2).

In the production process of the present invention, the sulfur source and the dihalo-aromatic compound are subjected to a polymerization reaction in the organic amide solvent, and the polyhalo-aromatic compound in a proportion of 0.010 to 0.100 mol per mol of the charged sulfur source and the phase separation agent are added into the polymerization reaction mixture at the point of time the conversion of the dihalo-aromatic compound has reached at least 80%. At the point of time the conversion of the dihalo-aromatic compound has reached at least 80%, the weight average molecular weight of a formed polymer (prepolymer) containing the polymerization reaction mixture generally comes to be 6,000 or higher.

The polyhalo-aromatic compound is used in a proportion of 0.010 to 0.100 mol, preferably 0.020 to 0.080 mol, more preferably 0.020 to 0.070 mol per mol of the charged sulfur source. If the amount of the polyhalo-aromatic compound used is too great, the melt viscoelasticity tan δ of the resulting branched PAS resin becomes too small, and the burr-inhibiting effect is lowered. If the amount of the polyhalo-aromatic compound used is too small, the introduction of the branched structure becomes insufficient to impair the burr-inhibiting effect.

If the polyhalo-aromatic compound is caused to exist in the reaction system from the beginning of the first-stage polymerization step to initiate a polymerization reaction, the melt viscosity of the resulting branched PAS resin is markedly increased, and the burr-inhibiting effect becomes insufficient. In addition, the surface properties of the resulting molded product are impaired. When the polyhalo-aromatic compound is caused to exist in the reaction system from the beginning of the first-stage polymerization step to initiate the polymerization reaction, and the polymerization time in the second-stage polymerization step is markedly shortened, a branched PAS resin having a low melt viscosity can be obtained. However, the melt viscoelasticity tan δ of this branched PAS resin becomes too great, and the burr-inhibiting effect becomes insufficient.

If the polyhalo-aromatic compound is added at the point of time the conversion of the dihalo-aromatic compound is lower than 80%, the resultant branched PAS resin shows a tendency to increase the melt viscosity, and on the other hand, the melt viscoelasticity tan δ thereof becomes too small, and the burr-inhibiting effect becomes insufficient.

The time when the polyhalo-aromatic compound is added is at the time the conversion of the dihalo-aromatic compound has reached preferably 80 to 98%, more preferably 85 to 95%. When the temperature of the first-stage polymerization is high, the polymerization temperature can be lowered in the course of the polymerization reaction, and the polyhalo-aromatic compound can be added at the point of time the conversion of the dihalo-aromatic compound has reached at least 80% to raise the temperature of the reaction system up to the temperature of the second-stage polymerization. The temperature of the polymerization reaction mixture at the time the first-stage polymerization step has been completed is desirably preset so as to become lower than the predetermined polymerization temperature specifically adopted in the second-stage polymerization step.

The phase separation agent is also added at the point of time the conversion of the dihalo-aromatic compound has reached at least 80%. The phase separation agent may be added at substantially the same time as the polyhalo-aromatic compound or after the polyhalo-aromatic compound is added. For example, the polyhalo-aromatic compound may be added into the polymerization reaction mixture at the point of time the conversion of the dihalo-aromatic compound has reached at least 80%, and the phase separation agent may be then added at the point of time the conversion of the dihalo-aromatic compound has reached at most 98%, preferably at most 95%.

As the phase separation agent, an alkali metal carboxylate or water may be used as described above, and water is preferably used because its cost is cheap, and a post treatment is easy. When water is used as the phase separation agent, water is preferably added into the polymerization reaction mixture at the point of time the conversion of the dihalo-aromatic compound has reached at least 80% in such a manner that the content (total water content) of water in the polymerization reaction mixture is higher than 2.00 mol, but not higher than 10.00 mol per mol of the charged sulfur source. It is desired that water be added as the phase separation agent in such a manner that the water content in the polymerization reaction mixture is preferably 2.30 to 7.00 mol, more preferably 2.50 to 5.00 mol per mol of the charged sulfur source.

In the second-stage polymerization step, the polymerization reaction is continued in a state phase-separated into a concentrated polymer phase and a dilute polymer phase by adding the phase separation agent. If the amount of the phase separation agent added is too small, it is difficult to conduct the phase-separation polymerization and to obtain a branched PAS resin having the desired properties. If the amount of the phase separation agent added is too great, it takes a long time to conduct the polymerization reaction, and it is difficult to form a granular polymer.

2.9.4. Heating (Temperature-Raising) Step

After the polyhalo-aromatic compound and the phase separation agent are added in the first-stage polymerization step, the polymerization reaction mixture is heated at a heating rate of 10 to 60° C./hour to raise the temperature of the mixture to at least 240° C., preferably at least 245° C. Since the polymerization reaction mixture is heated to a temperature of 240 to 290° C. in the second-stage polymerization step to continue the polymerization reaction, it is necessary to heat the polymerization reaction mixture after the first-stage polymerization step so as to raise the temperature of the mixture to a temperature suitable for the second-stage polymerization step. The upper limit of the temperature raised is the upper limit of the second-stage polymerization temperature.

If the heating rate is too slow, the production time is lengthened to lower production efficiency. If the heating rate is too fast on the other hand, the polymer formed aggregates in the concentrated polymer phase phase-separated to become enlarged. If the heating rate is too fast, the melt viscosity of a polymer formed may be rapidly increased in some cases. The heating rate is preferably 15 to 55° C./hour, more preferably 20 to 50° C./hour.

2.9.5. Second-Stage Polymerization Step

In the second-stage polymerization step, the polymerization reaction is generally continued in a state phase-separated into a concentrated polymer phase and a dilute polymer phase. Since the polymerization reaction is generally conducted under stirring, the phase-separation polymerization reaction is actually conducted in a state that the concentrated polymer phase has been dispersed as droplets in the organic amide solvent (dilute polymer phase). The phase-separated state is clearly observed with the progress of the second-stage polymerization reaction. The system of the polymerization reaction may be a batch system, a continuous system or a combination of both systems. In the batch-wise polymerization, 2 or more reaction vessels may be used for the purpose of shortening the polymerization cycle time.

In the second-stage polymerization step, the polymerization reaction is continued at a temperature of 240 to 290° C., preferably 245 to 270° C. The polymerization temperature may be kept at a fixed temperature, but may be raised or lower stepwise as needed.

The polymerization reaction time is within a range of generally from 10 minutes to 72 hours, preferably from 30 minutes to 48 hours in terms of the total time with the polymerization time in the first-stage polymerization step. The polymerization time in the second-stage polymerization step is often about 2 to 10 hours.

2.10. Post Treatment Step

A post treatment after the polymerization reaction may be conducted in accordance with a method known per se in the art. For example, when the reaction mixture is cooled after completion of the polymerization reaction, a slurry containing a polymer formed is obtained. The slurry cooled is separated by filtration as it is or after diluted with water or the like, and the resulting filter cake is washed and filtered repeatedly, and dried, whereby a branched PAS resin can be collected. According to the production process of the present invention, a granular polymer can be formed, so that the granular polymer is preferably separated from the slurry by a method of sieving the polymer by means of a screen because the polymer can be easily separated from by-products, oligomers, etc. The slurry may be subjected to sieving as it is in a high-temperature state, thereby collecting the polymer.

After the sieving, the polymer is preferably washed with the same organic amide solvent as the polymerization solvent, or an organic solvent such as a ketone (for example, acetone) or an alcohol (for example, methanol). The polymer may be washed with hot water or the like. The polymer may also be treated with an acid or a salt such as ammonium chloride. When the average particle diameter of the granular polymer is too great, a grinding step may be arranged so as to achieve the desired average particle diameter. Grinding and/or classification may also be conducted.

2.11. Branched PAS Resin:

According to the above-described production process, a branched PAS resin having the following properties a to c:

a) a melt viscosity of $11.0 \times 10^4$ to $27.0 \times 10^4$ Pa·s as measured at a temperature of 330° C. and a shear rate of 2 $sec^{-1}$, b) an average particle diameter of 50 to 2,000 μm, and c) a melt viscoelasticity tan δ of 0.10 to 0.30, preferably 0.11 to 0.29 as measured at a temperature of 310° C. and an angular velocity of 1 rad/sec can be obtained by arranging a step of grinding the polymer formed as needed after the polymerization reaction.

The melt viscosity (as measures at a temperature of 330° C. and a shear rate of 2 $sec^{-1}$) of the branched PAS resin according to the present invention is preferably $12.0 \times 10^4$ to $26.0 \times 10^4$ Pa·s in that the burr-inhibiting effect and the surface properties of the molded product are balanced with each other at a high level. The average particle diameter of the branched PAS resin according to the present invention is preferably 50 to 1,500 μm, more preferably 60 to 1,400 μm in that the burr-inhibiting effect and the surface properties of the resulting molded product are balanced with each other at a high level. The average particle diameter of the branched PAS resin can be controlled within a range of 80 to 1,000 μm from the viewpoint of stably balance the burr-inhibiting effect and the surface properties of the molded product within the ranges of the proportions of the respective components blended. The melt viscoelasticity tan δ (as measured at a temperature of 310° C. and an angular velocity of 1 rad/sec) of the branched PAS resin according to the present invention is preferably 0.11 to 0.29.

If the melt viscosity of the branched PAS resin is too high, the burr-inhibiting effect becomes insufficient, and the surface properties of the resulting molded product are deteriorated. If the melt viscosity of the branched PAS resin is too low, the burr-inhibiting effect becomes poor. If the average particle diameter of the branched PAS resin is too small, handling, metering and the like become difficult. If the average particle diameter of the branched PAS resin is too great, it is difficult to blend such a resin with other resins such as straight-chain PAS resins, and its moldability is lowered. If the melt viscoelasticity tan δ of the branched PAS resin is too small, the burr-inhibiting effect becomes poor. If the melt viscoelasticity tan δ of the branched PAS resin is too great, the burr-inhibiting effect becomes poor.

From the viewpoint of the surface properties of a molded product, the melt viscosity and average particle diameter of the branched PAS resin preferably fall within a region of a pentagon formed by linking 5 points in a graph that a melt viscosity measured at a temperature of 330° C. and a shear rate of 2 $sec^{-1}$ is plotted on x axis (axis of abscissa; unit: Pa·s), and an average particle diameter is plotted on y axis (axis of ordinate; unit: μm), i.e., the point A represented by $x=11.0 \times 10^4$ Pa·s and y=2,000 μm, the point B represented by $x=11.0 \times 10^4$ Pa·s and y=50 μm, the point C represented by $x=27.0 \times 10^4$ Pa·s and y=50 μm, the point D represented by $x=27.0 \times 10^4$ Pa·s and y=160 μm and the point E represented by $x=11.7 \times 10^4$ Pa·s and y=2,000 μm, by respective straight lines as illustrated in FIG. 1.

In other words, supposing that the melt viscosity is x (Pa·s), and the average particle diameter is y (μm), a branched PAS resin whose x and y fall within a region surrounded by the following equations (1) to (5):

$$y = 50 \tag{1}$$

$$y = 2{,}000 \tag{2}$$

$$x = 11.0 \times 10^4 \tag{3}$$

$$x = 27.0 \times 10^4 \quad (4), \text{ and}$$

$$y = -0.012x + 3{,}400 \quad (5)$$

is preferred in that a molded product excellent in surface properties is provided. The equation (5) is an empirical equation derived on the basis of the relationship between evaluation results of surface properties in Examples and Comparative Examples, which will be described subsequently, and the melt viscosity and average particle diameter of each branched PAS resin.

From the viewpoint of the surface properties of a molded product, the melt viscosity and average particle diameter of the branched PAS resin more preferably fall within a region of a pentagon formed by linking 5 points in a graph that a melt viscosity measured at a temperature of 330° C. and a shear rate of 2 sec$^{-1}$ is plotted on x axis (axis of abscissa; unit: Pa·s), and an average particle diameter is plotted on y axis (axis of ordinate; unit: μm), i.e., the point a represented by $x=12.0 \times 10^4$ Pa·s and y=1,500 μm, the point b represented by $x=12.0 \times 10^4$ Pa·s and y=50 μm, the point c represented by $x=26.0 \times 10^4$ Pa·s and y=50 μm, the point d represented by $x=26.0 \times 10^4$ Pa·s and y=280 μm and the point e represented by $x=15.8 \times$Pa·s and y=1,500 μm, by respective straight lines as illustrated in FIG. 2.

In other words, supposing that the melt viscosity is x (Pa·s), and the average particle diameter is y (μm), a branched PAS resin whose x and y fall within a region surrounded by the following equations (I) to (V):

$$y = 50 \quad (I),$$

$$y = 1{,}500 \quad (II),$$

$$x = 12.0 \times 10^4 \quad (III),$$

$$x = 26.0 \times 10^4 \quad (IV), \text{ and}$$

$$y = -0.012x + 3{,}400 \quad (V)$$

is more preferred in that a molded product excellent in surface properties is provided. The equation (V) is an empirical equation derived on the basis of the relationship between evaluation results of surface properties in Examples and Comparative Examples, which will be described subsequently, and the melt viscosity and average particle diameter of each branched PAS resin.

The branched PAS resin used in the present invention is excellent in color tone and heat stability compared with a heat-crosslinked PAS resin crosslinked by heat-treating a straight-chain PAS resin at a high temperature, and corrosiveness to metals such as a mold is little.

3. Inorganic Filler

Examples of the inorganic filler used in the present invention include calcium carbonate powders such as precipitated calcium carbonate, ground calcium carbonate, finely powdered calcium carbonate and specific calcium fillers; clay (aluminum silicate) such as calcined clay such as fine powder of nepheline syenite, montmorillonite and bentonite and silane-modified clay; talc; silica (silicon dioxide) powders such as fused silica and crystalline silica; silicic acid-containing compounds such as diatomaceous earth and quartz sand; ground products of natural minerals, such as pumice powder, pumice balloon, slate powder and mica powder; alumina-containing compounds such as alumina (aluminum oxide), alumina colloid (alumina sol), alumina white and aluminum sulfate; minerals such as barium sulfate, lithopone, calcium sulfate, molybdenum disulfide and graphite; glass fillers such as glass fibers, glass beads, glass flakes and foamed glass beads; fly ash balls, volcanic glass hollow bodies, synthetic inorganic hollow bodies, monocrystal potassium titanate, carbon fibers, carbon nanotubes, carbon hollow bodies, carbon 64 fullerene, anthracite powder, artificial cryolite, titanium oxide, magnesium oxide, basic magnesium carbonate, dolomite, potassium titanate, calcium sulfite, mica, asbestos, calcium silicate, aluminum powder, molybdenum sulfide, boron fibers, and silicon carbide fibers.

These inorganic fillers may be used either singly or in any combination thereof. By incorporating the inorganic filler, a resin composition excellent in mechanical properties can be obtained. The form of the inorganic filler may be any of a powder form, a granular form, a fibrous form, a flaky form and whisker. Among these, a fibrous inorganic filler is preferred. Examples of the fibrous inorganic filler include glass fibers, asbestos fibers, carbon fibers, silica fibers, silica/alumina fibers and potassium titanate fibers. Among these, glass fibers and carbon fibers are preferred, and glass fibers are more preferred.

4. PAS Resin Composition

The PAS resin composition according to the present invention is a resin composition obtained by blending 1 to 50 parts by weight of a branched PAS resin and 1 to 400 parts by weight of an inorganic filler with 100 parts by weight of a straight-chain PAS resin. The proportion of the branched PAS resin blended is preferably 5 to 45 parts by weight, more preferably 7 to 40 parts by weight. If the proportion of the branched PAS resin blended is too low, the burr-inhibiting effect is lowered. If the proportion of the branched PAS resin blended is too high, such a resin composition shows a tendency to lower the moldability and mechanical strength thereof.

The proportion of the inorganic filler blended is preferably 5 to 300 parts by weight, more preferably 10 to 250 parts by weight. By blending the inorganic filler, the mechanical strength of the resin composition can be enhanced. If the proportion of the inorganic filler blended is too low, it is difficult to sufficiently enhance the mechanical strength of the resin composition. If the proportion of the inorganic filler blended is too high, such a resin composition shows a tendency to lower the moldability, heat stability and mechanical strength thereof.

Other thermoplastic resins, organic fillers and various compounding additives may be added into the PAS resin composition according to the present invention as needed within limits not impairing the properties thereof. Examples of other thermoplastic resins include polyester resins such as liquid crystal polymers, aromatic polyesters, polyallylates, polyethylene terephthalate and polybutylene terephthalate; polyolefin resins such as polyethylene, polypropylene, ethylene-propylene copolymers, ethylene-α-olefin copolymers and poly(4-methylpentene-1); polyamide resins such as nylon 6, nylon 66 and aromatic nylon; cycloolefin resins such as thermoplastic norbornene resins; polyphenylene ether, poly(ether sulfone), polysulfone, polycarbonate, polyacetal, poly(methyl (meth)acrylate), polyacrylonitrile-styrene (AB resins), and polystyrene. However, the thermoplastic resins are not limited thereto.

As the polyolefin resins, may also be used polyolefin resins and olefin copolymers having a reactive functional group. Examples of these polyolefin resins include polyethylene, polypropylene, polybutene, ethylene-propylene copolymers and ethylene-α-olefin copolymers. Examples of the reactive functional group include an acid anhydride group, a glycidyl group and a carboxyl group. More specifically, copolymers composed of ethylene or an α-olefin and a glycidyl ester of an α,β-unsaturated acid are preferred. Examples of the a glycidyl ester of the α,β-unsaturated acid include glycidyl acrylate, glycidyl methacrylate and glycidyl ethacrylate. Among these, glycidyl methacrylate is preferred. The polyolefin resin may be a copolymer containing another unsaturated monomer, for example, vinyl ether, vinyl acetate, vinyl propionate, methyl (meth)acrylate, ethyl acrylate, butyl acrylate, acrylonitrile or styrene in a proportion of 40% by weight or lower.

Examples of the organic fillers include polyethylene fibers, polypropylene fibers, polyester fibers, polyamide fibers, polyaramide fibers, fluorocarbon fibers, ebonite powder, thermosetting resin hollow bodies, thermosetting resin fillers, epoxy resin fillers, silicone fillers, Saran hollow balls, shellac, wood flour, cork powder, polyvinyl alcohol fibers, cellulose powder and wood pulp. However, the organic fillers are not limited thereto.

No particular limitation is imposed on other compounding additives so far as they are generally used in the technical field of thermoplastic resin materials. Examples thereof include antioxidants, ultraviolet absorbents, light stabilizers, near infrared absorbents, colorants such as dyes and pigments, lubricants, plasticizers, antistatic agents, fluorescent brightening agents and flame retardants.

A silane compound may be blended within limits not impairing the effects of the present invention for the purpose of improving properties such as burr inhibition. Examples of the silane compound include various kinds of silane compounds such as vinylsilane, methacryloxysilane, epoxysilane, aminosilane and mercaptosilane. More specific examples thereof include vinyltrichlorosilane, γ-methacryloxypropyltrimethoxysilane, γ-glycidoxypropyl-trimethoxysilane, γ-aminopropyltriethoxysilane and γ-mercaptopropyltrimethoxysilane. However, the silane compounds are not limited thereto.

The PAS resin composition according to the present invention is prepared by mixing the above-described components as needed. No particular limitation is imposed on a mixing method so far as it is a method capable of sufficiently dispersing these components. Processes for producing the PAS resin composition include a process in which after the respective components are preliminarily mixed, the mixture is fed to, for example, a mixer, a twin-screw kneader, or a roll, Brabender, single-screw or twin-screw extruder to knead the mixture in a molten state. In particular, it is preferable from the viewpoint of high productivity that after the respective components are kneaded in a molten state by means of an extruder, the kneaded product is extruded into a rod form, and this rod is cut in proper lengths to provide pellets. The temperature upon melt kneading is a temperature higher by 5° C. to 100° C. than a temperature at which a resin component is melted, preferably a temperature higher by 10° C. to 60° C. than the melting point of the resin. The production process of the PAS resin composition according to the present invention includes a process in which the branched PAS resin is produced by the above-described production process, and the branched PAS resin is blended with the straight-chain PAS resin, inorganic filler, and the like.

The PAS resin composition according to the present invention can be molded into various molded products by general melt processing processes. Specifically, the PAS resin composition according to the present invention can be molded by, for example, injection molding, injection compression molding, compression molding and blow molding. Molded products obtained by using the PAS resin composition according to the present invention can be used in a wide variety of technical fields of electrical and electronic equipment part materials, automotive equipment part materials, chemical equipment part materials, water service-relating part materials, etc.

EXAMPLES

The present invention will hereinafter be described more specifically by the following Examples and Comparative Examples. However, the present invention is not limited to these examples. Measuring methods and evaluating methods of physical properties and properties are as follows.

(1) Melt Viscosity 1.1. Measuring Method 1

A melt viscosity was measured by using about 20 g of a dry polymer by means of CAPIROGRAPH 1-C (manufactured by Toyo Seiki Seisakusho, Ltd.). A flat die of 1 mm in diameter×10 mm in length was used as a capillary, and the temperature was set to 310° C. After the polymer sample was placed in the apparatus and held for 5 minutes at 310° C., the melt viscosity was measured at a shear rate of 1,216 $sec^{-1}$.

1.2. Measuring Method 2

A melt viscosity was measured by using about 10 g of a dry polymer by means of CAPIROGRAPH 1-C (manufactured by Toyo Seiki Seisakusho, Ltd.). An inlet angle-carrying die of 2.095 mm in diameter×7.995 mm in length was used as a capillary, and the temperature was set to 330° C. After the polymer sample was placed in the apparatus and held for 5 minutes at 330° C., the melt viscosity was measured at a shear rate of 2 $sec^{-1}$.

(2) Average Particle Diameter

Nine sieves having respectively sieve openings of 200 mesh, 150 mesh, 100 mesh, 60 mesh, 32 mesh, 24 mesh, 16 mesh, 12 mesh and 7 mesh from the bottom were laid on top of another in accordance with JIS K 0069, and a polymer sample was put on the uppermost sieve to conduct measurement under conditions of a shaking time of 15 minutes, an amplitude of 5 and an interval of 6 by means of an electromagnetic sieve shaker (ANALYSETTE 3) manufactured by FRITSCH CO.

(3) Burr Length

Each resin composition was injection-molded into a molded product for evaluation as to burr under the following conditions by means of an injection molding machine. A burr length at an occurring portion of burr in the molded product was measured by an image measuring apparatus and analyzed, thereby determining a burr length. In this testing method, it can be evaluated that the resin composition has a good inhibitory effect on the occurrence of burr when the burr length is 100 μm or shorter.

Molding machine: Toshiba 60t Molding Machine EC60N-1.5A,

Mold: Burr evaluation type (clearance of a burr evaluation part 20 μm),

Cylinder temperature: NH 320-320-320-305-300 (° C.),

Mold temperature: 150° C.

(4) Surface Properties of Molded Product

Each resin composition was injection-molded into a molded product of a specific form under the following conditions by means of an injection molding machine.

Molding machine: Toshiba 60t Molding Machine EC60N-1.5A,

Mold: 2 mm×60 mm×60 mm,

Cylinder temperature: NH 320-320-320-305-300 (° C.),

Mold temperature: 150° C.

The surfaces of 5 plates thus obtained were visually observed to evaluate the plates as to surface properties in accordance with the following standard. The number of non-melt parts is a total of the 5 plates.
1: None of non-melt parts was observed,
2: One to five non-melt parts were observed,
3: Six to twenty non-melt parts were observed,
4: At least 21 non-melt parts were observed.
(5) Mold-Corroding Tendency Four grams of resin pellets were placed on the bottom of a test tube having an inner diameter of 20 mm and a height of 200 mm, and a metal test piece (SKD-11, 16 mm×160 mm×2 mm) was hanged to a height of about 20 mm from the uppermost pellet. After the opening of the test tube was stoppered and held for 3 hours at 350° C., the metal test piece was placed in a humidity-controlling box (temperature: 23° C., relative humidity: 95%) and left to stand for 24 hours. Thereafter, the surface of the metal test piece was visually observed to make evaluation in accordance with the following standard.
A: Corrosion was scarcely observed,
B: Corrosion was slightly observed,
C: Corrosion was clearly observed.

Synthesis Example 1

Synthesis of Straight-Chain PAS Resin A1

(1) Dehydration Step

A 20-liter autoclave (reactor) made of titanium was charged with 1,951 g of an aqueous sodium hydrosulfide (NaSH) solution having an analytical value of 63.44% by weight as measured by iodimetry and 1,151 g (NaOH content: 21.52 mol) of a 74.78% by weight aqueous sodium hydroxide (NaOH) solution together with 6,701 g of N-methyl-2-pyrrolidone (hereinafter abbreviated as "NMP").

The sulfur (S) content in 1,951 g of the aqueous sodium hydrosulfide (NaSH) solution is 22.08 mol. The analytical value of NaSH by a neutralization titration method in this aqueous solution is 61.86% by weight (21.53 mol), and 0.55 mol of sodium sulfide ($Na_2S$) is contained therein. When a sulfur source composed of sodium hydrosulfide and sodium sulfide is indicated as "S", NaOH/NaSH before dehydration is 1.00 (mol/mol), and NaOH/S is 0.97 (mol/mol).

After the interior of the reactor was purged with nitrogen gas, the contents were gradually heated to 200° C. over 2.5 hours with stirring to distill off 893 g of water and 853 g of NMP. At this time, 0.4 mol of hydrogen sulfide ($H_2S$) was volatilized off. Accordingly, the amount of the available S in the reactor after the dehydration step was 21.68 mol. The amount of $H_2S$ volatilized off corresponded to 1.79 mol % based on the charged amount of S.

(2) Charging Step

After the dehydration step, the reactor containing 21.68 mol of the available S was cooled down to 170° C., 3,379 g of p-dichlorobenzene (hereinafter abbreviated as "pDCB") [pDCB/available S=1.060 (mol/mol)], 2,284 g of NMP and 114 g of water [total water content in the reactor/available S=1.50 (mol/mol)] were added, and 16 g of NaOH having a purity of 97% was added in such a manner that (NaOH in the reactor/available S) is 1.054 (mol/mol). NaOH (0.78 mol) produced by volatilization of $H_2S$ is contained in the reactor.

(3) Polymerization Step

While stirring the charging mixture at 250 rpm by a stirrer installed in the reactor, a reaction was conducted at 220° C. for 1.0 hour, and the reaction mixture was then heated to 230° C. in 30 minutes to conduct the reaction at 230° C. for 1.5 hours (first-stage polymerization step). The conversion of pDCB upon completion of the first-stage polymerization was 90%. The number of revolutions of the stirrer was then increased to 400 rpm, 442 g of water was charged under pressure into the reactor [total water content in the reactor/available S=2.63 (mol/mol)] while continuing the stirring, and the contents were heated to 255° C. to conduct a reaction for 4.0 hours (second-stage polymerization step).

(4) Post Treatment Step

After completion of the reaction, the reaction mixture was cooled near to room temperature and then sifted through a 100-mesh screen to collect a granular polymer. The polymer separated was washed 2 times with acetone, 3 times with water, with 0.3% acetic acid and then additionally 4 times with water to obtain a washed polymer. The washed polymer was dried at 105° C. for 13 hours. The yield of the granular polymer A1 thus obtained was 92%. The melt viscosity of the polymer A1 as measured at a temperature of 310° C. and a shear rate of 1,216 $sec^{-1}$ was 20 Pa·s. The polymerization formulation and the physical properties of the polymer are shown in Table 1.

Synthesis Example 2

Synthesis of Branched PAS Resin B1

(1) Dehydration Step

A 20-liter autoclave (reactor) made of titanium was charged with 1,801 g of an aqueous sodium hydrosulfide (NaSH) solution having an analytical value of 62.87% by weight as measured by iodimetry and 1,080 g (NaOH content: 20.08 mol) of a 74.40% by weight aqueous sodium hydroxide (NaOH) solution together with 6,000 g of NMP.

The sulfur (S) content in 1,801 g of the aqueous sodium hydrosulfide (NaSH) solution is 20.20 mol. The analytical value of NaSH by a neutralization titration method in this aqueous solution is 61.77% by weight (19.85 mol), and 0.35 mol of sodium sulfide ($Na_2S$) is contained therein. When a sulfur source composed of sodium hydrosulfide and sodium sulfide is indicated as "S", NaOH/NaSH before dehydration is 1.012 (mol/mol), and NaOH/S is 0.994 (mol/mol).

After the interior of the reactor was purged with nitrogen gas, the contents were gradually heated to 200° C. over 2 hours and 20 minutes with stirring to distill off 861 g. of water and 718 g of NMP. At this time, 0.38 mol of hydrogen sulfide ($H_2S$) was volatilized off. Accordingly, the amount of the available S in the reactor after the dehydration step was 19.82 mol. The amount of $H_2S$ volatilized off corresponded to 1.88 mol % based on the charged amount of S.

(2) Charging Step

After the dehydration step, the reactor containing 19.82 mol of the available S was cooled down to 170° C., 3,074 g of p-dichlorobenzene (pDCB) [pDCB/available S=1.055 (mol/mol)], 3,637 g of NMP and 115 g of water [total water content in the reactor/available S=1.50 (mol/mol)] were added, and 3 g of NaOH having a purity of 97% was added in such a manner that (NaOH in the reactor/available S) is 1.054 (mol/mol). NaOH (0.76 mol) produced by volatilization of $H_2S$ is contained in the reactor.

(3) Polymerization Step

While stirring the charging mixture at 250 rpm by a stirrer installed in the reactor, a reaction was conducted at 220° C. for 3.0 hours, and the reaction mixture was then cooled to 210° C. in 35 minutes (first-stage polymerization step). The conversion of pDCB upon completion of the first-stage polymerization was 90%. The number of revolutions of the stirrer was then increased to 400 rpm, 120.2 g of 1,2,4-trichlorobenzene (hereinafter abbreviated as "TCB") [TCB/available S=0.033 (mol/mol)] and 589 g of water were charged under pressure into the reactor [total water content in the reactor/ available S=3.15 (mol/mol)] while continuing the stirring, and the contents were heated to 255° C. at a heating rate of 33° C./hour to conduct a reaction for 5.0 hours (second-stage polymerization step).

(4) Post Treatment Step

After completion of the reaction, the reaction mixture was cooled near to room temperature and then sifted through a 100-mesh screen to collect a granular polymer. The polymer separated was washed 2 times with acetone, 3 times with water, with 0.3% acetic acid and then additionally 4 times with water to obtain a washed polymer. The washed polymer was dried at 105° C. for 13 hours. The yield of the granular polymer thus obtained was 83%. The polymer (average particle diameter: 510 μm) after the drying was ground by freeze grinding to obtain powder having an average particle diameter of 90 μm. This powdery polymer is referred to as polymer B1. The polymerization formulation and physical property data of the polymer B1 are shown in Table 1.

Synthesis Example 3

Synthesis Of Branched PAS Resin B2

(1) Dehydration Step

A 20-liter autoclave (reactor) made of titanium was charged with 1,840 g of an aqueous sodium hydrosulfide (NaSH) solution having an analytical value of 62.39% by weight as measured by iodimetry and 1,094 g (NaOH content: 20.28 mol) of a 74.16% by weight aqueous sodium hydroxide (NaOH) solution together with 6,005 g of NMP.

The sulfur (S) content in 1,840 g of the aqueous sodium hydrosulfide (NaSH) solution is 20.48 mol. The analytical value of NaSH by a neutralization titration method in this aqueous solution is 61.09% by weight (20.05 mol), and 0.43 mol of sodium sulfide ($Na_2S$) is contained therein. When a sulfur source composed of sodium hydrosulfide and sodium sulfide is indicated as "S", NaOH/NaSH before dehydration is 1.011 (mol/mol), and NaOH/S is 0.990 (mol/mol).

After the interior of the reactor was purged with nitrogen gas, the contents were gradually heated to 200° C. over 2 hours with stirring to distill off 898 g of water and 903 g of NMP. At this time, 0.35 mol of hydrogen sulfide ($H_2S$) was volatilized off. Accordingly, the amount of the available S in the reactor after the dehydration step was 20.12 mol. The amount of $H_2S$ volatilized off corresponded to 1.73 mol % based on the charged amount of S.

(2) Charging Step

After the dehydration step, the reactor containing 20.12 mol of the available S was cooled down to 170° C., 3,114 g of p-dichlorobenzene (pDCB) [pDCB/available S=1.053 (mol/mol)], 3,952 g of NMP and 128 g of water [total water content in the reactor/available S=1.50 (mol/mol)] were added, and 6 g of NaOH having a purity of 97% was added in such a manner that (NaOH in the reactor/available S) is 1.054 (mol/mol). NaOH (0.71 mol) produced by volatilization of $H_2S$ is contained in the reactor.

(3) Polymerization Step

While stirring the charging mixture at 250 rpm by a stirrer installed in the reactor, a reaction was conducted at 220° C. for 3.0 hours, and the reaction mixture was then cooled to 210° C. in 35 minutes (first-stage polymerization step). The conversion of pDCB upon completion of the first-stage polymerization was 91%. The number of revolutions of the stirrer was then increased to 400 rpm, 165.0 g of trichlorobenzene (TCB) [TCB/available S=0.045 (mol/mol)] and 598 g of water were charged under pressure into the reactor [total water content in the reactor/available S=3.15 (mol/mol)] while continuing the stirring, and the contents were heated to 255° C. at a heating rate of 36° C./hour to conduct a reaction for 2.0 hours (second-stage polymerization step).

(4) Post Treatment Step

After completion of the reaction, the reaction mixture was cooled near to room temperature and then sifted through a 100-mesh screen to collect a granular polymer. The polymer separated was washed 2 times with acetone, 3 times with water, with 0.3% acetic acid and then additionally 4 times with water to obtain a washed polymer. The washed polymer was dried at 105° C. for 13 hours. The yield of the granular polymer thus obtained was 87%. The polymerization formulation and physical property data of the polymer B2 are shown in Table 1.

Synthesis Example 4

Synthesis of Branched PAS Resin B3

Synthesis was conducted in the same manner as in Synthesis Example 2 (Synthesis Example of B1) except that (pDCB/available S) and the heating rate to the second-stage polymerization were changed from 1.055 (mol/mol) to 1.053 (mol/mol) and from 33° C./hour to 30° C./hour, respectively. The yield of the granular polymer thus obtained was 84%. The physical property data of the polymer is shown in Table 1. The polymer (average particle diameter: 350 μm) after the drying was ground by freeze grinding to obtain powder having an average particle diameter of 110 μm. This powdery polymer is referred to as polymer B3. The polymerization formulation and physical property data of the polymer B3 are shown in Table 1.

Synthesis Example 5

Synthesis of Branched PAS Resin B4

Synthesis was conducted in the same manner as in Synthesis Example 4 (Synthesis Example of B3) except that (pDCB/available S) and (TCB/available S) were changed from 1.053 (mol/mol) to 1.067 (mol/mol) and from 0.033 (mol/mol) to 0.034 (mol/mol), respectively. The yield of the granular polymer thus obtained was 83%. The polymerization formulation and physical property data of the polymer B4 are shown in Table 1.

Synthesis Example 6

Synthesis of Branched PAS Resin B5

Synthesis was conducted in the same manner as in Synthesis Example 4 (Synthesis Example of B3) except that (pDCB/available S) was changed from 1.053 (mol/mol) to 1.050 (mol/mol). The yield of the granular polymer thus obtained was 84%. The polymerization formulation and physical property data of the polymer B5 are shown in Table 1.

Synthesis Example 7

Synthesis Of Branched PAS Resin B6

Synthesis was conducted in the same manner as in Synthesis Example 4 (Synthesis Example of B3) except that (pDCB/available S) and (TCB/available S) were changed from 1.053 (mol/mol) to 1.055 (mol/mol) and from 0.033 (mol/mol) to 0.057 (mol/mol), respectively. The yield of the granular polymer thus obtained was 85%. The polymerization formulation and physical property data of the polymer B6 are shown in Table 1.

p-dichlorobenzene (pDCB) [pDCB/available S=0.961 (mol/mol)], 3,908 g of NMP and 152 g of water [total water content in the reactor/available S=1.50 (mol/mol)] were added, and 7

TABLE 1

|  |  | Syn. Ex. 1 | Syn. Ex. 2 | Syn. Ex. 3 | Syn. Ex. 4 | Syn. Ex. 5 | Syn. Ex. 6 | Syn. Ex. 7 |
|---|---|---|---|---|---|---|---|---|
| First-stage polymerization |  |  |  |  |  |  |  |  |
| PDCB/available S | mol/mol | 1.060 | 1.055 | 1.053 | 1.053 | 1.067 | 1.050 | 1.055 |
| TCB/available S | mol/mol | 0 | 0 | 0 | 0 | 0 | 0 | 0 |
| NaOH/available S | mol/mol | 1.054 | 1.054 | 1.054 | 1.054 | 1.054 | 1.054 | 1.054 |
| $H_2O$/available S | mol/mol | 1.50 | 1.50 | 1.50 | 1.50 | 1.50 | 1.50 | 1.50 |
| Temperature/time | °C./h | 220/1.0 230/1.5 | 220/3.0 | 220/3.0 | 220/3.0 | 220/3.0 | 220/3.0 | 220/3.0 |
| Temperature upon completion of first-stage polymerization | °C. | 230 | 210 | 210 | 210 | 210 | 210 | 210 |
| Addition of TCB and water |  |  |  |  |  |  |  |  |
| Conversion upon addition of TCB | % | — | 90 | 91 | 90 | 90 | 90 | 90 |
| TCB/available S | mol/mol | 0 | 0.033 | 0.045 | 0.033 | 0.034 | 0.033 | 0.057 |
| $H_2O$/available S | mol/mol | 2.63 | 3.15 | 3.15 | 3.15 | 3.15 | 3.15 | 3.15 |
| Heating rate | °C./h | 36 | 33 | 36 | 30 | 30 | 30 | 30 |
| Second-stage polymerization |  |  |  |  |  |  |  |  |
| Temperature/time | °C./h | 255/4.0 | 255/5.0 | 255/2.0 | 255/5.0 | 255/5.0 | 255/5.0 | 255/5.0 |
| Melt viscosity (330° C., 2 sec$^{-1}$) | Pa·s | 20*[1] | 234,000 | 170,000 | 250,000 | 205,000 | 288,000 | 105,000 |
| Average particle diameter | μm | — | 510 | 400 | 350 | 1,040 | 200 | 450 |
| Average particle diameter after grinding | μm | — | 90 | — | 110 | — | — | — |
| Melt viscoelasticity (tan δ) ω = 1 rad/sec | — | — | 0.18 | 0.13 | 0.15 | 0.23 | 0.16 | 0.28 |
| Resin code |  | A1 Straight-chain | B1 Branched | B2 Branched | B3 Branched | B4 Branched | B5 Branched | B6 Branched |

(Note)
*[1] The melt viscosity of the straight-chain PAS resin is a value measured at a temperature of 310° C. and a shear rate of 1,216 sec$^{-1}$.

Synthesis Example 8

Synthesis of Branched PAS Resin B7

(1) Dehydration Step

A 20-liter autoclave (reactor) made of titanium was charged with 1,841 g of an aqueous sodium hydrosulfide (NaSH) solution having an analytical value of 62.39% by weight as measured by iodimetry and 1,094 g (NaOH content: 20.29 mol) of a 74.16% by weight aqueous sodium hydroxide (NaOH) solution together with 6,002 g of NMP.

The sulfur (S) content in 1,841 g of the aqueous sodium hydrosulfide (NaSH) solution is 20.48 mol. The analytical value of NaSH by a neutralization titration method in this aqueous solution is 61.09% by weight (20.06 mol), and 0.43 mol of sodium sulfide ($Na_2S$) is contained therein. When a sulfur source composed of sodium hydrosulfide and sodium sulfide is indicated as "S", NaOH/NaSH before dehydration is 1.012 (mol/mol), and NaOH/S is 0.991 (mol/mol).

After the interior of the reactor was purged with nitrogen gas, the contents were gradually heated to 200° C. over 2 hours with stirring to distill off 922 g of water and 848 g of NMP. At this time, 0.35 mol of hydrogen sulfide ($H_2S$) was volatilized off. Accordingly, the amount of the available S in the reactor after the dehydration step was 20.14 mol. The amount of $H_2S$ volatilized off corresponded to 1.70 mol % based on the charged amount of S.

(2) Charging Step

After the dehydration step, the reactor containing 20.14 mol of the available S was cooled down to 170° C., 2,844 g of g of NaOH having a purity of 97% was added in such a manner that (NaOH in the reactor/available S) is 1.054 (mol/mol). NaOH (0.69 mol) produced by volatilization of $H_2S$ is contained in the reactor.

(3) Polymerization Step

While stirring the charging mixture at 250 rpm by a stirrer installed in the reactor, a reaction was conducted at 220° C. for 3.0 hours, and the reaction mixture was then cooled to 210° C. in 35 minutes (first-stage polymerization step). The conversion of pDCB upon completion of the first-stage polymerization was 90%. The number of revolutions of the stirrer was then increased to 400 rpm, 409.3 g of trichlorobenzene (TCB) [TCB/available S=0.113 (mol/mol)] and 599 g of water were charged under pressure into the reactor [total water content in the reactor/available S=3.15 (mol/mol)] while continuing the stirring, and the contents were heated to 255° C. at a heating rate of 58° C./hour to conduct a reaction for 5.0 hours (second-stage polymerization step).

(4) Post Treatment Step

After completion of the reaction, the reaction mixture was cooled near to room temperature and then sifted through a 100-mesh screen to collect a granular polymer. The polymer separated was washed 2 times with acetone, 3 times with water, with 0.3% acetic acid and then additionally 4 times with water to obtain a washed polymer. The washed polymer was dried at 105° C. for 13 hours. The yield of the granular polymer thus obtained was 84%. The polymerization formulation and physical property data of the polymer B7 are shown in Table 2.

Synthesis Example 9

Synthesis of Branched PAS Resin B8

(1) Dehydration Step

A 20-liter autoclave (reactor) made of titanium was charged with 1,696 g of an aqueous sodium hydrosulfide (NaSH) solution having an analytical value of 62.12% by weight as measured by iodimetry and 972 g (NaOH content: 17.97 mol) of a 73.95% by weight aqueous sodium hydroxide (NaOH) solution together with 6,004 g of NMP.

The sulfur (S) content in 1,696 g of the aqueous sodium hydrosulfide (NaSH) solution is 18.79 mol. The analytical value of NaSH by a neutralization titration method in this aqueous solution is 59.50% by weight (18.00 mol), and 0.79 mol of sodium sulfide ($Na_2S$) is contained therein. When a sulfur source composed of sodium hydrosulfide and sodium sulfide is indicated as "S", NaOH/NaSH before dehydration is 0.998 (mol/mol), and NaOH/S is 0.956 (mol/mol).

After the interior of the reactor was purged with nitrogen gas, the contents were gradually heated to 200° C. over 2 hours and 30 minutes with stirring to distill off 850 g of water and 940 g of NMP. At this time, 0.45 mol of hydrogen sulfide ($H_2S$) was volatilized off. Accordingly, the amount of the available S in the reactor after the dehydration step was 18.34 mol. The amount of $H_2S$ volatilized off corresponded to 2.40 mol % based on the charged amount of S.

(2) Charging step

After the dehydration step, the reactor containing 18.34 mol of the available S was cooled down to 170° C., 2,715 g of p-dichlorobenzene (pDCB) [pDCB/available S=1.007 (mol/mol)], 52 g of TCB [TCB/available S=0.015 (mol/mol)], 3,604 g of NMP and 160 g of water [total water content in the reactor/available S=1.50 (mol/mol)] were added, and 5 g of NaOH having a purity of 97% was added in such a manner that (NaOH in the reactor/available S) is 1.054 (mol/mol). NaOH (0.90 mol) produced by volatilization of $H_2S$ is contained in the reactor.

(3) Polymerization Step

While stirring the charging mixture at 250 rpm by a stirrer installed in the reactor, a reaction was conducted at 220° C. for 4 hours and 35 minutes, and the reaction mixture was then cooled to 210° C. in 35 minutes (first-stage polymerization step). The conversion of pDCB upon completion of the first-stage polymerization was 92%. The number of revolutions of the stirrer was then increased to 400 rpm, 826 g of water was charged under pressure into the reactor [total water content in the reactor/available S=4.00 (mol/mol)] while continuing the stirring, and the contents were heated to 255° C. at a heating rate of 33° C./hour to conduct a reaction for 5.0 hours (second-stage polymerization step).

(4) Post Treatment Step

After completion of the reaction, the reaction mixture was cooled near to room temperature and then sifted through a 100-mesh screen to collect a granular polymer. The polymer separated was washed 2 times with acetone, 3 times with water, with 0.3% acetic acid and then additionally 4 times with water to obtain a washed polymer. The washed polymer was dried at 105° C. for 13 hours. The yield of the granular polymer thus obtained was 69%. The polymerization formulation and physical property data of the polymer B8 are shown in Table 2.

Synthesis Example 10

Synthesis of Branched PAS Resin B9

Synthesis was conducted in the same manner as in Synthesis Example 9 except that (pDCB/available S) and the second-stage polymerization time were changed to 1.036 (mol/mol) and 1.0 hour, respectively. The yield of the granular polymer thus obtained was 71%. The polymerization formulation and physical property data of the polymer B9 are shown in Table 2.

Synthesis Example 11

Synthesis of Branched PAS Resin B10

Synthesis was conducted in the same manner as in Synthesis Example 2 except that (pDCB/available S) was changed from 1.055 (mol/mol) to 1.060 (mol/mol), and trichlorobenzene (TCB) was added after 1.0 hour from the beginning of the first-stage polymerization. The conversion of pDCB upon the addition of TCB was 65%. The polymerization formulation and physical property data of the polymer B10 thus obtained are shown in Table 2.

Synthesis Example 12

Synthesis of Branched PAS Resin B11

Synthesis was conducted in the same manner as in Synthesis Example 2 except that (pDCB/available S) was changed from 1.055 (mol/mol) to 1.060 (mol/mol), and the heating rate from the first-stage polymerization to the second-stage polymerization was changed to 70° C./hour. As a result, the particles of the polymer formed became enlarged, and a part thereof became a great mass. The polymerization formulation and physical property data of the polymer B11 thus obtained are shown in Table 2. However, this polymer was difficult to form a uniform resin composition (pellets) with a straight-chain PAS resin, and the moldability of the resultant resin composition was poor, so that evaluation as to molding was not made.

Synthesis Example 13

Synthesis of heat-crosslinked PAS resin B12

A straight-chain PPS resin was synthesized in the same manner as in Synthesis Example 1 except that (pDCB/available S) was changed from 1.060 (mol/mol) to 1.040 (mol/mol). The yield of the granular polymer thus obtained was 92%. The melt viscosity of the polymer B12 as measured at a temperature of 310° C. and a shear rate of 1,216 $sec^{-1}$ was 55 Pa·s. The straight-chain PPS resin after drying was placed in an oven to conduct a heat-crosslinking treatment at 250° C. for 8 hours. In such a manner, a heat-crosslinked PAS resin B12 having a melt viscosity of 200,000 as measured at a temperature of 330° C. and a shear rate of 2 $sec^{-1}$ and an average particle diameter of 350 μm was obtained. The polymerization formulation and physical property data of the heat-crosslinked PAS resin B12 are shown in Table 2.

TABLE 2

|  |  | Syn. Ex. 8 | Syn. Ex. 9 | Syn. Ex. 10 | Syn. Ex. 11 | Syn. Ex. 12 | Syn. Ex. 13 |
|---|---|---|---|---|---|---|---|
| First-stage polymerization |  |  |  |  |  |  |  |
| PDCB/available S | mol/mol | 0.961 | 1.007 | 1.036 | 1.060 | 1.060 | 1.040 |
| TCB/available S | mol/mol | 0 | 0.015 | 0.015 | 0 | 0 | 0 |
| NaOH/available S | mol/mol | 1.054 | 1.054 | 1.054 | 1.054 | 1.054 | 1.054 |
| $H_2O$/available S | mol/mol | 1.50 | 1.50 | 1.50 | 1.50 | 1.50 | 1.50 |
| Temperature/time | °C./h | 220/3.0 | 220/4.6 | 220/4.6 | 220/3.0 | 220/3.0 | 220/1.0 230/1.5 |
| Temperature upon completion of first-stage polymerization | °C. | 210 | 210 | 210 | 210 | 210 | 230 |
| Addition of TCB and water |  |  |  |  |  |  |  |
| Conversion upon addition of TCB | % | 90 | 0 | 0 | 65 | 90 | — |
| TCB/available S | mol/mol | 0.113 | 0.015 | 0.015 | 0.033 | 0.033 | 0 |
| $H_2O$/available S | mol/mol | 3.15 | 4.00 | 4.00 | 3.15 | 3.15 | 2.63 |
| Heating rate | °C./h | 58 | 33 | 33 | 33 | 70 | 36 |
| Second-stage polymerization |  |  |  |  |  |  |  |
| Temperature/time | °C./h | 255/5.0 | 255/5.0 | 255/1.0 | 255/5.0 | 255/5.0 | 255/4.0 |
| Melt viscosity (330° C., 2 sec$^{-1}$) | Pa·s | 215,000 | 1,020,000 | 240,000 | 490,000 | 250,000 | 200,000 |
| Average particle diameter | μm | 240 | 190 | 810 | 110 | 2,570 | 350 |
| Average particle diameter after grinding | μm | — | — | — | — | — | — |
| Melt viscoelasticity (tan δ) ω = 1 rad/sec |  | 0.07 | 0.28 | 0.37 | 0.05 | 0.26 | — |
| Resin code |  | B7 Branched | B8 Branched | B9 Branched | B10 Branched | B11 Branched | B12 Heat-crosslinked |

Synthesis Example 14

Synthesis of Branched PAS Resin B13

(1) Dehydration Step

A 20-liter autoclave (reactor) made of titanium was charged with 1,839 g of an aqueous sodium hydrosulfide (NaSH) solution having an analytical value of 62.39% by weight as measured by iodimetry and 1,091 g (NaOH content: 20.23 mol) of a 74.16% by weight aqueous sodium hydroxide (NaOH) solution together with 6,017 g of NMP.

The sulfur (S) content in 1,839 g of the aqueous sodium hydrosulfide (NaSH) solution is 20.47 mol. The analytical value of NaSH by a neutralization titration method in this aqueous solution is 61.09% by weight (20.04 mol), and 0.43 mol of sodium sulfide (Na$_2$S) is contained therein. When a sulfur source composed of sodium hydrosulfide and sodium sulfide is indicated as "S", NaOH/NaSH before dehydration is 1.009 (mol/mol), and NaOH/S is 0.988 (mol/mol).

After the interior of the reactor was purged with nitrogen gas, the contents were gradually heated to 200° C. over 2 hours with stirring to distill off 892 g of water and 907 g of NMP. At this time, 0.35 mol of hydrogen sulfide (H$_2$S) was volatilized off. Accordingly, the amount of the available S in the reactor after the dehydration step was 20.12 mol. The amount of H$_2$S volatilized off corresponded to 1.69 mol % based on the charged amount of S.

(2) Charging Step

After the dehydration step, the reactor containing 20.12 mol of the available S was cooled down to 170° C., 3,164 g of p-dichlorobenzene (pDCB) [pDCB/available S=1.070 (mol/mol)], 3,945 g of NMP and 123 g of water [total water content in the reactor/available S=1.50 (mol/mol)] were added, and 9 g of NaOH having a purity of 97% was added in such a manner that (NaOH in the reactor/available S) is 1.054 (mol/mol). NaOH (0.69 mol) produced by volatilization of H$_2$S is contained in the reactor.

(3) Polymerization Step

While stirring the charging mixture at 250 rpm by a stirrer installed in the reactor, a reaction was conducted at 220° C. for 3.0 hours, and the reaction mixture was then cooled to 210° C. in 35 minutes (first-stage polymerization step). The conversion of pDCB upon completion of the first-stage polymerization was 91%. The number of revolutions of the stirrer was then increased to 400 rpm, 120.8 g of trichlorobenzene (TCB) [TCB/available S=0.033 (mol/mol)] and 598 g of water were charged under pressure into the reactor [total water content in the reactor/available S=3.15 (mol/mol)] while continuing the stirring, and the contents were heated to 255° C. at a heating rate of 30° C./hour to conduct a reaction for 5.0 hours (second-stage polymerization step).

(4) Post Treatment Step

After completion of the reaction, the reaction mixture was cooled near to room temperature and then sifted through a 100-mesh screen to collect a granular polymer. The polymer separated was washed 2 times with acetone, 3 times with water, with 0.3% acetic acid and then additionally 4 times with water to obtain a washed polymer. The washed polymer was dried at 105° C. for 13 hours. The yield of the granular polymer thus obtained was 84%. The physical property and property data of the polymer B13 are shown in Table 3.

Synthesis Example 15

Synthesis of Branched PAS Resin B14

Synthesis was conducted in the same manner as in Synthesis Example 6 except that (total water content in the reactor/available S) upon the beginning of the second-stage polymerization was changed from 3.15 (mol/mol) to 3.60 (mol/mol). The yield of the granular polymer thus obtained was 84%. The polymerization formulation and physical property data of the polymer B14 are shown in Table 3.

Synthesis Example 16

Synthesis of Branched PAS Resin B15

(1) Dehydration Step

A 20-liter autoclave (reactor) made of titanium was charged with 1,841 g of an aqueous sodium hydrosulfide (NaSH) solution having an analytical value of 62.39% by weight as measured by iodimetry and 1,094 g (NaOH content: 20.29 mol) of a 74.16% by weight aqueous sodium hydroxide (NaOH) solution together with 6,010 g of NMP.

The sulfur (S) content in 1,841 g of the aqueous sodium hydrosulfide (NaSH) solution is 20.49 mol. The analytical value of NaSH by a neutralization titration method in this aqueous solution is 61.09% by weight (20.06 mol), and 0.43 mol of sodium sulfide ($Na_2S$) is contained therein. When a sulfur source composed of sodium hydrosulfide and sodium sulfide is indicated as "S", NaOH/NaSH before dehydration is 1.011 (mol/mol), and NaOH/S is 0.990 (mol/mol).

After the interior of the reactor was purged with nitrogen gas, the contents were gradually heated to 200° C. over 2 hours with stirring to distill off 917 g of water and 862 g of NMP. At this time, 0.35 mol of hydrogen sulfide ($H_2S$) was volatilized off. Accordingly, the amount of the available S in the reactor after the dehydration step was 20.13 mol. The amount of $H_2S$ volatilized off corresponded to 1.73 mol % based on the charged amount of S.

(2) Charging Step

After the dehydration step, the reactor containing 20.13 mol of the available S was cooled down to 170° C., 3,171 g of p-dichlorobenzene (pDCB) [pDCB/available S=1.072 (mol/mol)], 3,911 g of NMP and 147 g of water [total water content in the reactor/available S=1.50 (mol/mol)] were added, and 6 g of NaOH having a purity of 97% was added in such a manner that (NaOH in the reactor/available S) is 1.054 (mol/mol). NaOH (0.71 mol) produced by volatilization of $H_2S$ is contained in the reactor.

(3) Polymerization Step

While stirring the charging mixture at 250 rpm by a stirrer installed in the reactor, a reaction was conducted at 220° C. for 3.0 hours, and the reaction mixture was then cooled to 210° C. in 35 minutes (first-stage polymerization step). The conversion of pDCB upon completion of the first-stage polymerization was 91%. The number of revolutions of the stirrer was then increased to 400 rpm, 123.3 g of trichlorobenzene (TCB) [TCB/available S=0.034 (mol/mol)] and 599 g of water were charged under pressure into the reactor [total water content in the reactor/available S=3.15 (mol/mol)] while continuing the stirring, and the contents were heated to 255° C. at a heating rate of 30° C./hour to conduct a reaction for 2.0 hours (second-stage polymerization step).

(4) Post Treatment Step

After completion of the reaction, the reaction mixture was cooled near to room temperature and then sifted through a 100-mesh screen to collect a granular polymer. The polymer separated was washed 2 times with acetone, 3 times with water, with 0.3% acetic acid and then additionally 4 times with water to obtain a washed polymer. The washed polymer was dried at 105° C. for 13 hours. The yield of the granular polymer thus obtained was 83%. The physical property and property data of the polymer B15 are shown in Table 3.

Synthesis Example 17

Synthesis of Branched PAS Resin B16

(1) Dehydration Step

A 20-liter autoclave (reactor) made of titanium was charged with 1,848 g of an aqueous sodium hydrosulfide (NaSH) solution having an analytical value of 62.39% by weight as measured by iodimetry and 1,094 g (NaOH content: 20.28 mol) of a 74.16% by weight aqueous sodium hydroxide (NaOH) solution together with 6,006 g of NMP.

The sulfur (S) content in 1,848 g of the aqueous sodium hydrosulfide (NaSH) solution is 20.56 mol. The analytical value of NaSH by a neutralization titration method in this aqueous solution is 61.09% by weight (20.13 mol), and 0.43 mol of sodium sulfide ($Na_2S$) is contained therein. When a sulfur source composed of sodium hydrosulfide and sodium sulfide is indicated as "S", NaOH/NaSH before dehydration is 1.007 (mol/mol), and NaOH/S is 0.986 (mol/mol).

After the interior of the reactor was purged with nitrogen gas, the contents were gradually heated to 200° C. over 2 hours with stirring to distill off 904 g of water and 890 g of NMP. At this time, 0.35 mol of hydrogen sulfide ($H_2S$) was volatilized off. Accordingly, the amount of the available S in the reactor after the dehydration step was 20.21 mol. The amount of $H_2S$ volatilized off corresponded to 1.70 mol % based on the charged amount of S.

(2) Charging Step

After the dehydration step, the reactor containing 20.21 mol of the available S was cooled down to 170° C., 3,095 g of p-dichlorobenzene (pDCB) [pDCB/available S=1.042 (mol/mol)], 3,980 g of NMP and 132 g of water [total water content in the reactor/available S=1.50 (mol/mol)] were added, and 9.9 g of NaOH having a purity of 97% was added in such a manner that (NaOH in the reactor/available S) is 1.054 (mol/mol). NaOH (0.70 mol) produced by volatilization of $H_2S$ is contained in the reactor.

(3) Polymerization Step

While stirring the charging mixture at 250 rpm by a stirrer installed in the reactor, a reaction was conducted at 220° C. for 3.0 hours, and the reaction mixture was then cooled to 210° C. in 35 minutes (first-stage polymerization step). The conversion of pDCB upon completion of the first-stage polymerization was 90%. The number of revolutions of the stirrer was then increased to 400 rpm, 208.3 g of trichlorobenzene (TCB) [TCB/available S=0.056 (mol/mol)] and 601 g of water were charged under pressure into the reactor [total water content in the reactor/available S=3.15 (mol/mol)] while continuing the stirring, and the contents were heated to 255° C. at a heating rate of 48° C./hour to conduct a reaction for 2.0 hours (second-stage polymerization step).

(4) Post Treatment Step

After completion of the reaction, the reaction mixture was cooled near to room temperature and then sifted through a 100-mesh screen to collect a granular polymer. The polymer separated was washed 2 times with acetone, 3 times with water, with 0.3% acetic acid and then additionally 4 times with water to obtain a washed polymer. The washed polymer was dried at 105° C. for 13 hours. The yield of the granular polymer thus obtained was 81%. The physical property and property data of the polymer B16 are shown in Table 3.

Synthesis Example 18

Synthesis of Branched PAS Resin B17

(1) Dehydration Step

A 20-liter autoclave (reactor) made of titanium was charged with 1,845 g of an aqueous sodium hydrosulfide (NaSH) solution having an analytical value of 62.39% by weight as measured by iodimetry and 1,094 g (NaOH content: 20.28 mol) of a 74.16% by weight aqueous sodium hydroxide (NaOH) solution together with 6,002 g of NMP.

The sulfur (S) content in 1,845 g of the aqueous sodium hydrosulfide (NaSH) solution is 20.53 mol. The analytical value of NaSH by a neutralization titration method in this aqueous solution is 61.09% by weight (20.10 mol), and 0.43 mol of sodium sulfide ($Na_2S$) is contained therein. When a sulfur source composed of sodium hydrosulfide and sodium sulfide is indicated as "S", NaOH/NaSH before dehydration is 1.009 (mol/mol), and NaOH/S is 0.988 (mol/mol).

After the interior of the reactor was purged with nitrogen gas, the contents were gradually heated to 200° C. over 2 hours with stirring to distill off 927 g of water and 864 g of NMP. At this time, 0.35 mol of hydrogen sulfide ($H_2S$) was volatilized off. Accordingly, the amount of the available S in the reactor after the dehydration step was 20.18 mol. The amount of $H_2S$ volatilized off corresponded to 1.72 mol % based on the charged amount of S.

(2) Charging Step

After the dehydration step, the reactor containing 20.18 mol of the available S was cooled down to 170° C., 3,164 g of p-dichlorobenzene (pDCB) [pDCB/available S=1.067 (mol/mol)], 3,942 g of NMP and 156 g of water [total water content in the reactor/available S=1.50 (mol/mol)] were added, and 8.5 g of NaOH having a purity of 97% was added in such a manner that (NaOH in the reactor/available S) is 1.054 (mol/mol). NaOH (0.71 mol) produced by volatilization of $H_2S$ is contained in the reactor.

(3) Polymerization Step

While stirring the charging mixture at 250 rpm by a stirrer installed in the reactor, a reaction was conducted at 220° C. for 3.0 hours, and the reaction mixture was then cooled to 210° C. in 35 minutes (first-stage polymerization step). The conversion of pDCB upon completion of the first-stage polymerization was 91%. The number of revolutions of the stirrer was then increased to 400 rpm, 123.1 g of trichlorobenzene (TCB) [TCB/available S=0.034 (mol/mol)] and 600 g of water were charged under pressure into the reactor [total water content in the reactor/available S=3.15 (mol/mol)] while continuing the stirring, and the contents were heated to 255° C. at a heating rate of 29° C./hour to conduct a reaction for 5.0 hours (second-stage polymerization step).

(4) Post Treatment Step

After completion of the reaction, the reaction mixture was cooled near to room temperature and then sifted through a 100-mesh screen to collect a granular polymer. The polymer separated was washed 2 times with acetone, 3 times with water, with 0.3% acetic acid and then additionally 4 times with water to obtain a washed polymer. The washed polymer was dried at 105° C. for 13 hours. The yield of the granular polymer thus obtained was 83%. The physical property and property data of the polymer B17 are shown in Table 3.

TABLE 3

|  |  | Syn. Ex. 14 | Syn. Ex. 15 | Syn. Ex. 16 | Syn. Ex. 17 | Syn. Ex. 18 |
| --- | --- | --- | --- | --- | --- | --- |
| First-stage polymerization |  |  |  |  |  |  |
| PDCB/available S | mol/mol | 1.070 | 1.050 | 1.072 | 1.042 | 1.067 |
| TCB/available S | mol/mol | 0 | 0 | 0 | 0 | 0 |
| NaOH/available S | mol/mol | 1.054 | 1.054 | 1.054 | 1.054 | 1.054 |
| $H_2O$/available S | mol/mol | 1.50 | 1.50 | 1.50 | 1.50 | 1.50 |
| Temperature/time | ° C./h | 220/3.0 | 220/3.0 | 220/3.0 | 220/3.0 | 220/3.0 |
| Temperature upon completion of first-stage polymerization | ° C. | 210 | 210 | 210 | 210 | 210 |
| Addition of TCB and water |  |  |  |  |  |  |
| Conversion upon addition of TCB | % | 91 | 90 | 91 | 90 | 91 |
| TCB/available S | mol/mol | 0.033 | 0.033 | 0.034 | 0.056 | 0.034 |
| $H_2O$/available S | mol/mol | 3.15 | 3.60 | 3.15 | 3.15 | 3.15 |
| Heating rate | ° C./h | 30 | 30 | 30 | 48 | 29 |
| Second-stage polymerization |  |  |  |  |  |  |
| Temperature/time | ° C./h | 255/5.0 | 255/5.0 | 255/2.0 | 255/2.0 | 255/5.0 |
| Melt viscosity (330° C., 2 $sec^{-1}$) | Pa·s | 182,000 | 245,000 | 122,000 | 142,000 | 200,000 |
| Average particle diameter | μm | 1,330 | 580 | 1,250 | 1,370 | 710 |
| Average particle diameter after grinding | μm | — | — | — | — | — |
| Melt viscoelasticity (tan δ) ω = 1 rad/sec |  | 0.23 | 0.13 | 0.27 | 0.11 | 0.23 |
| Resin code |  | B13 Branched | B14 Branched | B15 Branched | B16 Branched | B17 Branched |

Example 1

With 100 parts by weight of the straight-chain PAS resin (A1) synthesized in Synthesis Example 1 were blended 15 parts by weight of the branched PAS resin (B1) synthesized in Synthesis Example 2 and 80 parts by weight of an inorganic filler (C1). As the inorganic filler (C1) were used glass fibers (chopped strand having a diameter of 13 μm; product of Asahi Fiber Glass Co., Ltd., trade name "CSO3JAFT636"). Specifically, the 3 components were mixed for 2 minutes, and the mixture was then charged into a twin-screw extruder of a cylinder temperature of 320° C. to prepare pellets of a resin composition. The pellets thus obtained were used to make evaluation as to the burr length, surface properties of a molded product and mold-corroding tendency according to the above-described testing methods. The results are shown in Table 4.

Examples 2 to 11

Respective pellets were prepared in the same manner as in Example 1 except that the kinds and blending proportions of the respective components were changed as shown in Table 4. The respective pellets thus obtained were used to make evaluation as to the burr length, surface properties of a molded product and mold-corroding tendency according to the above-described testing methods. The results are shown in Table 4.

invention are excellent in the burr-inhibiting effect, provide molded products having good surface properties and have no mold-corroding tendency.

As shown in Table 5, the surface properties of the resulting molded product are deteriorated when the melt viscosity of the branched PAS resin is too high (Comparative Example 1). The burr-inhibiting effect is lowered when the melt viscosity of the branched PAS resin is too low (Comparative Example 2). The burr-inhibiting effect is markedly lowered when the blending proportion of the branched PAS resin is too low

TABLE 4

| | | Straight-chain PAS (A) | | Branched PAS (B) | | | | Filler (C)*2 | | Burr length | Surface property of molded | Mold-corroding |
|---|---|---|---|---|---|---|---|---|---|---|---|---|
| | | | | | Melt viscosity 330° C., 2 sec$^{-1}$ | Average particle diameter | Melt viscoelasticity tan δ | | | | | |
| | | Code | part | Code | (Pa · s) | (μm) | ω = 1 rad/sec | part | Code | part | (μm) | product | tendency |
| Example | 1 | A1 | 100 | B1 | 234,000 | 90 | 0.18 | 15 | C1 | 80 | 84 | 1 | A |
| | 2 | A1 | 100 | B2 | 170,000 | 400 | 0.13 | 15 | C1 | 80 | 88 | 1 | A |
| | 3 | A1 | 100 | B3 | 250,000 | 110 | 0.15 | 15 | C1 | 80 | 80 | 1 | A |
| | 4 | A1 | 100 | B4 | 205,000 | 1,040 | 0.23 | 15 | C1 | 80 | 75 | 2 | A |
| | 5 | A1 | 100 | B1 | 234,000 | 90 | 0.18 | 10 | C1 | 80 | 95 | 1 | A |
| | 6 | A1 | 100 | B1 | 234,000 | 90 | 0.18 | 30 | C1 | 80 | 60 | 1 | A |
| | 7 | A1 | 100 | B13 | 182,000 | 1,330 | 0.23 | 15 | C1 | 80 | 79 | 2 | A |
| | 8 | A1 | 100 | B14 | 245,000 | 580 | 0.13 | 15 | C1 | 80 | 80 | 2 | A |
| | 9 | A1 | 100 | B15 | 122,000 | 1,250 | 0.27 | 15 | C1 | 80 | 80 | 1 | A |
| | 10 | A1 | 100 | B16 | 142,000 | 1,370 | 0.11 | 15 | C1 | 80 | 92 | 1 | A |
| | 11 | A1 | 100 | B17 | 200,000 | 710 | 0.23 | 15 | C1 | 80 | 82 | 1 | A |

Comparative Examples 1 to 10

Respective pellets were prepared in the same manner as in Example 1 except that the kinds and blending proportions of the respective components were changed as shown in Table 5. The respective pellets thus obtained were used to make evaluation as to the burr length, surface properties of a molded product and mold-corroding tendency according to the above-described testing methods. The results are shown in Table 5. However, in Comparative Examples 4 and 9, pellets could not be prepared, and so no evaluation was made.

(Comparative Example 3). The moldability is impaired when the blending proportion of the branched PAS resin is too high (Comparative Example 4). The burr-inhibiting effect is lowered when the melt viscoelasticity tan δ of the branched PAS resin is too small (Comparative Example 5).

The burr property is lowered, and the surface properties are also deteriorated when the branched PAS resin B8 obtained by causing trichlorobenzene to react from the beginning of the polymerization and having a too high melt viscosity is used (Comparative Example 6). The burr-inhibiting effect is lowered, and the surface properties of the molded product are

TABLE 5

| | | Straight-chain PAS (A) | | Branched PAS (B) | | | | Filler (C)*2 | | Burr length | Surface property of molded | Mold-corroding |
|---|---|---|---|---|---|---|---|---|---|---|---|---|
| | | | | | Melt viscosity 330° C., 2 sec$^{-1}$ | Average particle diameter | Melt viscoelasticity tan δ | | | | | |
| | | Code | part | Code | (Pa · s) | (μm) | ω = 1 rad/sec | part | Code | part | (μm) | product | tendency |
| Comparative Example | 1 | A1 | 100 | B5 | 288,000 | 200 | 0.16 | 15 | C1 | 80 | 81 | 4 | A |
| | 2 | A1 | 100 | B6 | 105,000 | 450 | 0.28 | 15 | C1 | 80 | 128 | 1 | A |
| | 3 | A1 | 100 | B1 | 234,000 | 90 | 0.18 | 0.1 | C1 | 80 | 450 | 1 | A |
| | 4 | A1 | 100 | B1 | 234,000 | 90 | 0.18 | 200 | C1 | 80 | | Not molded | |
| | 5 | A1 | 100 | B7 | 215,000 | 240 | 0.07 | 15 | C1 | 80 | 125 | 1 | A |
| | 6 | A1 | 100 | B8 | 1,020,000 | 190 | 0.28 | 15 | C1 | 80 | 110 | 4 | A |
| | 7 | A1 | 100 | B9 | 240,000 | 810 | 0.37 | 15 | C1 | 80 | 145 | 3 | A |
| | 8 | A1 | 100 | B10 | 490,000 | 110 | 0.05 | 15 | C1 | 80 | 150 | 4 | A |
| | 9 | A1 | 100 | B11 | 250,000 | 2,570 | 0.26 | 15 | C1 | 80 | | Not molded | |
| | 10 | A1 | 100 | B12*1 | 200,000 | 350 | — | 15 | C1 | 80 | 85 | 1 | C |

(Note)
*1Heat-crosslinked PAS resin: a heat-crosslinked PPS resin obtained by subjecting a straight-chain PPS resin having a melt viscosity of 55 Pa · s as measured at a temperature of 310° C. and a shear rate of 1,216 sec$^{-1}$ to a heat treatment at a temperature of 250° C. for 8 hours.
*2Glass fibers: chopped strand having a diameter of 13 μm; product of Asahi Fiber Glass Co., Ltd., trade name "CS03JAFT636".

Consideration:

As apparent from the results shown in Table 4, the resin compositions (Examples 1 to 11) according to the present also deteriorated when the branched PAS resin B9 obtained by causing trichlorobenzene to react from the beginning of the polymerization and having a too high melt viscoelasticity tan δ is used (Comparative Example 7). The burr-inhibiting effect is lowered, and the surface properties of the molded product are also deteriorated when the branched PAS resin B10 obtained by adding trichlorobenzene at a stage when the conversion to a polymer in the first-stage polymerization step is low and having a too low melt viscoelasticity tan δ is used (Comparative Example 8).

It is difficult to form a uniform resin composition (pellets) with a straight-chain PAS resin when the branched PAS resin obtained by accelerating the heating rate from the first-stage polymerization to the second-stage polymerization as 70° C./hour is used (Comparative Example 9). In addition, the moldability of the resin composition is also deteriorated. Corrosion of the mold is observed when the heat-crosslinked PAS resin obtained by subjecting the straight-chain PAS resin to the heat treatment is used (Comparative Example 10).

In FIG. 1, the melt viscosities and average particle diameters of the respective branched PAS resins used in Examples 1 to 11 and Comparative Examples 1, 2, 5 and 7 are plotted, and preferable cases where the evaluation results of the surface properties of the resultant molded products are all 1 are indicated by a region of a pentagon formed by linking 5 points of A, B, C, D and E by respective straight lines. However, the plotting of the branched PAS resins (Comparative Examples 6, 8 and 9) too high or great in the melt viscosity or average particle diameter was omitted. Likewise, the plotting of cases (Comparative Examples 3 and 4) where the blending proportion of the branched PAS resin did not fall within the range defined in the present invention, and a case (Comparative Example 10) where the heat-crosslinked PAS resin was used was also omitted.

In FIG. 2, the melt viscosities and average particle diameters of the respective branched PAS resins used in Examples 1 to 11 and Comparative Examples 1, 2, 5 and 7 are plotted, and more preferable cases where the evaluation results of the surface properties of the resultant molded products are all 1 are indicated by a region of a pentagon formed by linking 5 points of a, b, c, d and e by respective straight lines.

INDUSTRIAL APPLICABILITY

The PAS resin compositions according to the present invention contain the branched PAS resin having the specific physical properties, whereby the occurrence of burr is markedly inhibited, and molded products excellent in surface properties can be provided, and mold-corroding tendency is little.

The PAS resin compositions according to the present invention can be molded into various molded products by injection molding, injection compression molding, compression molding, blow molding and the like. Molded products obtained by using the PAS resin compositions according to the present invention can be used in a wide variety of technical fields of electrical and electronic equipment part materials, automotive equipment part materials, chemical equipment part materials, water service-relating part materials, etc.

The invention claimed is:

1. A poly(arylene sulfide) resin composition, comprising:
(A) 100 parts by weight of a straight-chain poly(arylene sulfide) resin having a melt viscosity of 5 to 1,000 Pa·s as measured at a temperature of 310° C. and a shear rate of 1,216 $sec^{-1}$,
(B) 1 to 50 parts by weight of a branched poly(arylene sulfide) resin having a melt viscosity of $11.0 \times 10^4$ to $27.0 \times 10^4$ Pa·s as measured at a temperature of 330° C. and a shear rate of 2 $sec^{-1}$, an average particle diameter of 50 to 2,000 μm and a melt viscoelasticity tan δ of 0.10 to 0.30 as measured at a temperature of 310° C. and an angular velocity of 1 rad/sec, wherein (B) the branched poly(arylene sulfide) resin has a melt viscosity and an average particle diameter that fall within a region of a pentagon formed by linking 5 points in a graph that a melt viscosity measured at a temperature of 330° C. and a shear rate of 2 $sec^{-1}$ is plotted on x axis, and an average particle diameter is plotted on y axis, i.e., the point A represented by $x=11.0 \times 10^4$ Pa·s and y=2,000 μm, the point B represented by $x=11.0 \times 10^4$ Pa·s and y=50 μm, the point C represented by $x=27.0 \times 10^4$ Pa·s and y=50 μm, the point D represented by $x=27.0 \times 10^4$ Pa·s and y=160 μm and the point E represented by $x=11.7 \times 10^4$ Pa·s and y=2,000 μm, by respective straight lines, and wherein the branched poly(arylene sulfide) resin is a branched poly(arylene sulfide) resin into which a branched structure has been introduced by a process including reacting a sulfur source containing more than 50 mol % of the alkali metal hydrosulfide and a dihalo-aromatic compound in an organic amide solvent and adding a polyhalo-aromatic compound having 3 or more halogen substituents in a predetermined proportion to the polymerization reaction mixture at the point of time the conversion of the dihalo-aromatic compound has reached at least 80%, and
(C) 1 to 400 parts by weight of an inorganic filler, wherein the poly(arylene sulfide) resin composition contain (B) the branched poly(arylene sulfide) resin, whereby the occurrence of burr is markedly inhibited, and molded products excellent in surface properties can be provided, and mold-corroding tendency is reduced.

2. The poly(arylene sulfide) resin composition according to claim 1, wherein (A) the straight-chain poly(arylene sulfide) resin is a poly(arylene sulfide) resin having a linear structure obtained by polycondensation of a sulfur source and a dihalo-aromatic compound and substantially containing neither a branched structure nor a heat-crosslinked structure.

3. The poly(arylene sulfide) resin composition according to claim 1, wherein (A) the straight-chain poly(arylene sulfide) resin is a poly(p-phenylene sulfide) resin.

4. The poly(arylene sulfide) resin composition according to claim 1, wherein the melt viscosity of (B) the branched poly(arylene sulfide) resin is $12.0 \times 10^4$ to $26.0 \times 10^4$ Pa·s.

5. The poly(arylene sulfide) resin composition according to claim 1, wherein the average particle diameter of (B) the branched poly(arylene sulfide) resin is 50 to 1,500 μm.

6. The poly(arylene sulfide) resin composition according to claim 1, wherein the melt viscoelasticity tan δ of (B) the branched poly(arylene sulfide) resin is 0.11 to 0.29.

7. The poly(arylene sulfide) resin composition according to claim 1, wherein (B) the branched poly(arylene sulfide) resin has a melt viscosity and an average particle diameter that fall within a region of a pentagon formed by linking 5 points in a graph that a melt viscosity measured at a temperature of 330° C. and a shear rate of 2 $sec^{-1}$ is plotted on x axis, and an average particle diameter is plotted on y axis, i.e., the point a represented by $x=12.0 \times 10^4$ Pa·s and y=1,500 μm, the point b represented by $x=12.0 \times 10^4$ Pa·s and y=50 μm, the point c represented by $x=26.0 \times 10^4$ Pa·s and y=50 μm, the point d represented by $x=26.0 \times 10^4$ Pa·s and y=280 μm and the point e represented by $x=15.8 \times 10^4$ Pa·s and y=1,500 μm, by respective straight lines.

8. The poly(arylene sulfide) resin composition according to claim 1, wherein (C) the inorganic filler is a fibrous inorganic filler.

9. The poly(arylene sulfide) resin composition according to claim 8, wherein the fibrous inorganic filler is glass fiber or carbon fiber.

10. A process for producing a poly(arylene sulfide) resin composition, comprising the following Steps I to III:
- I) Polymerization Step I of subjecting a sulfur source and a dihalo-aromatic compound to a polymerization reaction at a temperature of 170 to 270° C. in an organic amide solvent, adding a polyhalo-aromatic compound in an amount of 0.010 to 0.100 mol per mol of the sulfur source, and a phase separation agent to the resultant polymerization reaction mixture at the point of time the conversion of the dihalo-aromatic compound has reached at least 80%, then heating the polymerization reaction mixture at a heating rate of 10 to 60° C./hour to raise the temperature of the mixture to at least 240° C., and continuing the polymerization reaction at a temperature of 240 to 290° C.;
- II) Step II of recovering a branched poly(arylene sulfide) resin having a melt viscosity of $11.0 \times 10^4$ to $27.0 \times 10^4$ Pa·s as measured at a temperature of 330° C. and a shear rate of 2 sec$^{-1}$, an average particle diameter of 50 to 2,000 μm and a melt viscoelasticity tan δ of 0.10 to 0.30 as measured at a temperature of 310° C. and an angular velocity of 1 rad/sec after the polymerization step; and
- III) Step III of blending 1 to 50 parts by weight of the branched poly(arylene sulfide) resin and 1 to 400 parts by weight of an inorganic filler with 100 parts by weight of a substantially linear straight-chain poly(arylene sulfide) resin.

11. The production process according to claim 10, wherein the Step I comprises the following Steps 1 to 5:
- (1) Dehydration Step I of heating a mixture containing the organic amide solvent, the sulfur source including an alkali metal hydrosulfide, and an alkali metal hydroxide to discharge at least a part of a distillate containing water from the interior of the system containing the mixture to the exterior of the system;
- (2) Charging Step 2 of mixing the mixture remaining in the system after the dehydration step with the dihalo-aromatic compound to prepare a charging mixture containing the organic amide solvent, the sulfur source (hereinafter referred to as "charged sulfur source"), the alkali metal hydroxide, water and the dihalo-aromatic compound;
- (3) First-Stage Polymerization Step 3 of heating the charging mixture to a temperature of 170 to 270° C., thereby subjecting the sulfur source and the dihalo-aromatic compound to a polymerization reaction in the organic amide solvent containing water, and adding the polyhalo-aromatic compound in an amount of 0.010 to 0.100 mol per mol of the charged sulfur source, and a phase separation agent to the resultant polymerization reaction mixture at the point of time the conversion of the dihalo-aromatic compound has reached at least 80%;
- (4) Heating Step 4 of heating the polymerization reaction mixture at a heating rate of 10 to 60° C./hour to raise the temperature of the mixture to at least 240° C.; and
- (5) Second-Stage Polymerization Step 5 of continuing the polymerization reaction at a temperature of 240 to 290° C.

12. The production process according to claim 11, wherein in the Dehydration Step 1, a mixture containing the organic amide solvent, the sulfur source including an alkali metal hydrosulfide, and an alkali metal hydroxide in a proportion of 0.900 to 1.050 mol per mol of the sulfur source is heated to discharge at least a part of a distillate containing water from the interior of the system containing the mixture to the exterior of the system.

13. The production process according to claim 11, wherein in the Dehydration Step 1, dehydration is conducted until the water content is reduced to 0.00 to 2.00 mol per mol of the sulfur source (charged sulfur source) remaining in the system after the Dehydration Step 1.

14. The production process according to claim 11, wherein in the Charging Step 2, the charged sulfur source contains more than 50 mol % of the alkali metal hydrosulfide and less than 50 mol % of an alkali metal sulfide.

15. The production process according to claim 11, wherein in the Charging Step 2, the charging mixture containing the respective components is prepared in such a manner that the proportions of the alkali metal hydroxide, water and the dihalo-aromatic compound are 0.950 to 1.090 mol, 0.00 to 2.00 mol and 0.950 to 1.200 mol, respectively, per mol of the charged sulfur source.

16. The production process according to claim 11, wherein in the First-Stage Polymerization Step 3, water is added as the phase separation agent into the polymerization reaction mixture at the point of time the conversion of the dihalo-aromatic compound has reached at least 80% in such a manner that the content of water in the polymerization reaction mixture is higher than 2.00 mol, but not higher than 10.00 mol per mol of the charged sulfur source.

17. The production process according to claim 10, wherein the Step II includes a grinding step of grinding a polymer formed after the polymerization step to control the average particle diameter of the branched poly(arylene sulfide) resin so as to fall within a range of 50 to 2,000 μm.

* * * * *